US012021583B2

(12) United States Patent
Lee et al.

(10) Patent No.: US 12,021,583 B2
(45) Date of Patent: Jun. 25, 2024

(54) METHOD AND APPARATUS FOR MODULAR MIMO

(71) Applicant: Samsung Electronics Co., Ltd., Suwon-si (KR)

(72) Inventors: Gilwon Lee, McKinney, TX (US); Jeongho Jeon, San Jose, CA (US); Eko Onggosanusi, Coppell, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 17/673,641

(22) Filed: Feb. 16, 2022

(65) Prior Publication Data

US 2022/0271802 A1 Aug. 25, 2022

Related U.S. Application Data

(60) Provisional application No. 63/170,247, filed on Apr. 2, 2021, provisional application No. 63/162,183, filed on Mar. 17, 2021, provisional application No. 63/153,653, filed on Feb. 25, 2021, provisional application No. 63/151,431, filed on Feb. 19, 2021.

(51) Int. Cl.
*H04B 7/0413* (2017.01)
(52) U.S. Cl.
CPC ................... *H04B 7/0413* (2013.01)
(58) Field of Classification Search
CPC .. H04B 7/0413; H04B 7/0456; H04W 72/044
See application file for complete search history.

(56) References Cited

U.S. PATENT DOCUMENTS

| 10,911,195 B2 | 2/2021 | Park et al. |
| 2014/0269502 A1* | 9/2014 | Forenza ............... H04B 7/0626 370/328 |
| 2021/0014085 A1 | 1/2021 | Chen et al. |

FOREIGN PATENT DOCUMENTS

WO 2019212859 A1 11/2019

OTHER PUBLICATIONS

International Search Report and Written Opinion dated Jun. 2, 2022 regarding Application No. PCT/KR2022/002477, 9 pages.
LG Electronics, "CLI configuration", 3GPP TSG-RAN WG2 Meeting #111 electronic, R2-2008201, Sep. 2020, 25 pages.
"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.
(Continued)

*Primary Examiner* — Rahel Guarino

(57) ABSTRACT

A method for operating a user equipment (UE) comprises receiving configuration information about L uplink (UL) reference signals (RSs), M downlink (DL) RSs, and a calibration report, where the L UL RSs are associated with the M DL RSs; transmitting the UL RSs according to the configuration information; measuring the DL RSs; determining, based on the measured DL RSs and a reference DL RS, calibration information; and transmitting the calibration report including the calibration information.

20 Claims, 15 Drawing Sheets

(56) References Cited

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.

"LTE; Evolved Universal Terrestrial Radio Access (E-UTRA); Physical layer procedures (3GPP TS 36.213 version 16.4.0 Release 16)", ETSI TS 136 213 V16.4.0, Feb. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.

"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.

"3rd Generation Partnership Project; Technical Specification Group Radio Access Network; NR; Physical channels and modulation (Release 16)", 3GPP TS 38.211 V16.4.0, Dec. 2020, 133 pages.

"3rd Generation Partnership Project; Technical Specification Group Radio Access Network; NR; Multiplexing and channel coding (Release 16)", 3GPP TS 38.212 V16.4.0, Dec. 2020, 152 pages.

"3rd Generation Partnership Project; Technical Specification Group Radio Access Network; NR; Physical layer procedures for control (Release 16)", 3GPP TS 38.213 V16.4.0, Dec. 2020, 181 pages.

"3rd Generation Partnership Project; Technical Specification Group Radio Access Network; NR; Physical layer procedures for data (Release 16)", 3GPP TS 38.214 V16.4.0, Dec. 2020, 169 pages.

"5G; NR; Physical layer measurements (3GPP TS 38.215 version 16.4.0 Release 16)", ETSI TS 138 215 V16.4.0, Jan. 2021, 31 pages.

"3rd Generation Partnership Project; Technical Specification Group Radio Access Network; NR; Medium Access Control (MAC) protocol specification (Release 16)", 3GPP TS 38.321 V16.3.0, Dec. 2020, 156 pages.

"3rd Generation Partnership Project; Technical Specification Group Radio Access Network; NR; Radio Resource Control (RRC) protocol specification (Release 16)", 3GPP TS 38.331 V16.3.1, Jan. 2021, 932 pages.

"5G; NG-RAN; F1 Application Protocol (F1AP) (3GPP TS 38.473 version 16.4.0 Release 16)", ETSI TS 138 473 V16.4.0, Jan. 2021, 465 pages.

* cited by examiner

METHOD AND APPARATUS FOR MODULAR MIMO

CROSS-REFERENCE TO RELATED APPLICATIONS AND CLAIM OF PRIORITY

The present application claims priority to U.S. Provisional Patent Application No. 63/151,431, filed on Feb. 19, 2021, U.S. Provisional Patent Application No. 63/153,653, filed on Feb. 25, 2021, U.S. Provisional Patent Application No. 63/162,183, filed on Mar. 17, 2021, Sep. 10, 2021, and U.S. Provisional Patent Application No. 63/170,247, filed on Apr. 2, 2021. The content of the above-identified patent documents is incorporated herein by reference.

TECHNICAL FIELD

The present disclosure relates generally to wireless communication systems and more specifically to methods and apparatus for modular MIMO, distributed MIMO, or multi-TRP MIMO.

BACKGROUND

For a cellular system operating in a sub-1GHz frequency range (e.g. less than 1 GHz), supporting a large number of CSI-RS antenna ports (e.g. 32) at a single location or remote radio head (RRH) is challenging due to the fact that a larger antenna form factor size is needed at these frequencies than a system operating at a higher frequency such as 2 GHz or 4 GHz. At such low frequencies, the maximum number of CSI-RS antenna ports that can be co-located at a single site (or RRH) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1GHz system with large number of CSI-RS antenna ports is based on distributing antenna ports at multiple locations (or panels/RRHs). The multiple sites or panels/RRHs can still be connected to a single (common) base unit, hence the signal transmitted/received via multiple distributed RRHs can still be processed at a centralized location.

SUMMARY

Embodiments of the present disclosure provide methods and apparatuses for modular MIMO, distributed MIMO, or multi-TRP MIMO in a wireless communication system.

In one embodiment, a UE in a wireless communication system is provided. The UE includes a transceiver configured to receive configuration information about L uplink (UL) reference signals (RSs), M downlink (DL) RSs, and a calibration report, where the L UL RSs are associated with the M DL RSs; and transmit the UL RSs according to the configuration information. The UE further includes a processor operably coupled to the transceiver. The processor is configured to: measure the DL RSs; and determine, based on the measured DL RSs and a reference DL RS, calibration information, wherein the transceiver is further configured to transmit the calibration report including the calibration information.

In another embodiment, a BS in a wireless communication system is provided. The BS includes a processor configured to generate configuration information about L UL RSs, MDL RSs, and a calibration report, where the L UL RSs are associated with the MDL RSs. The BS further includes a transceiver operably coupled to the processor. The transceiver is configured to: transmit the configuration information; receive the UL RSs; and receive the calibration report including calibration information, wherein the calibration information is based on measured DL RSs and a reference DL RS.

In yet another embodiment, a method for operating a UE is provided. The method comprises: receiving configuration information about L UL RSs, M DL RSs, and a calibration report, where the L UL RSs are associated with the M DL RSs; transmitting the UL RSs according to the configuration information; measuring the DL RSs; determining, based on the measured DL RSs and a reference DL RS, calibration information; and transmitting the calibration report including the calibration information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
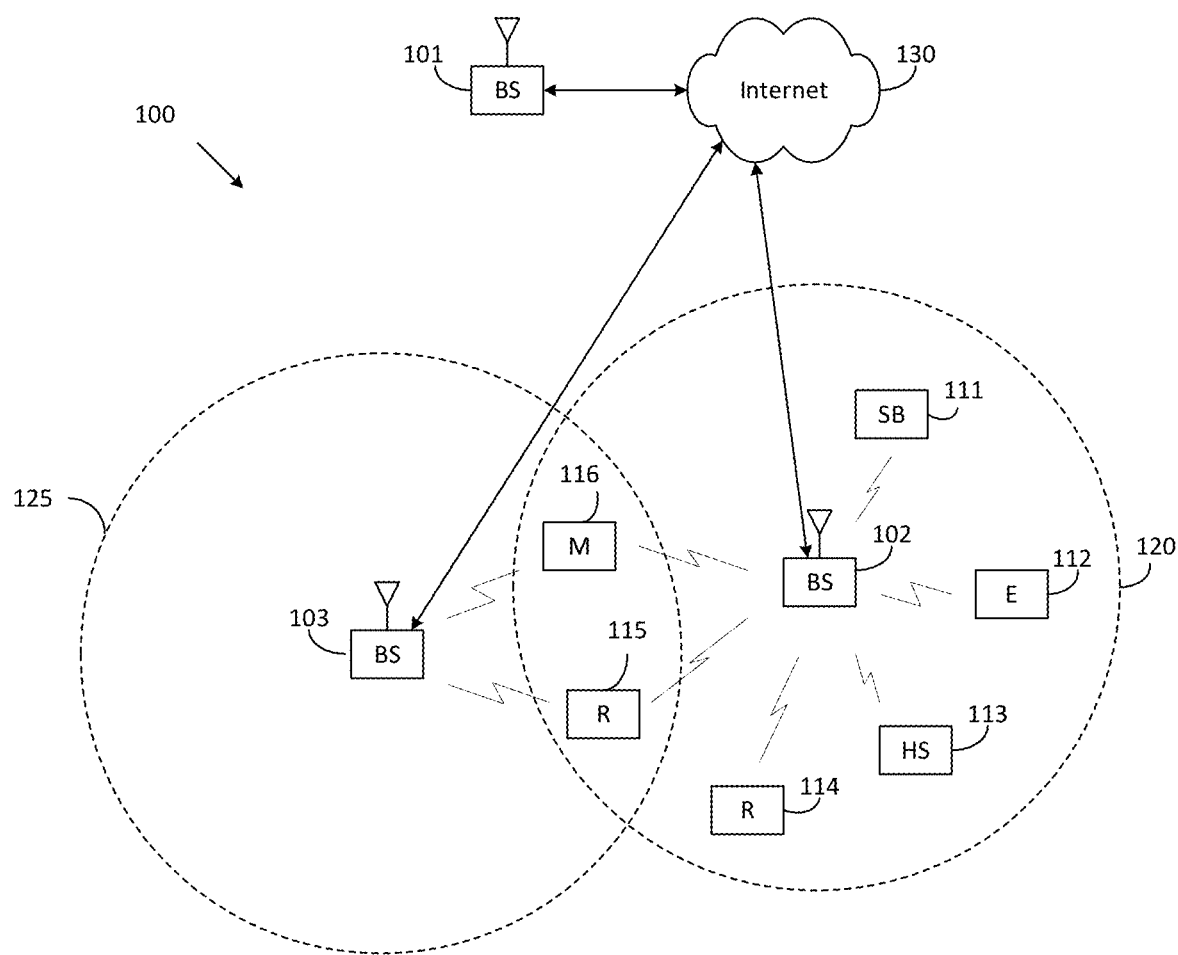
FIG. 1 illustrates an example wireless network according to embodiments of the present disclosure.

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v v17.0.0, "E-UTRA, Physical Layer Procedures" (herein "REF 3"); 3GPP TS 36.321 v v17.0.0, "E-UTRA, Medium Access Control (MAC) protocol specification" (herein "REF 4"); 3GPP TS 36.331 v v17.0.0, "E-UTRA, Radio Resource Control (RRC) protocol specification" (herein "REF 5"); 3GPP TS 38.211 v v17.0.0, "NR, Physical channels and modulation" (herein "REF 6"); 3GPP TS 38.212 v v17.0.0, "E-UTRA, NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0, "NR, Physical Layer Measurements" (herein "REF 10"); 3GPP TS 38.321 v17.0.0, "NR, Medium Access Control (MAC) protocol specification" (herein "REF 11"); 3GPP TS 38.331 v17.0.0, "NR, Radio Resource Control (RRC) Protocol Specification" (herein "REF 12") and 3GPP TS 38.473 v16.4.0, "NG-RAN; F1 Application Protocol (FLAP) (herein "REF 13").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
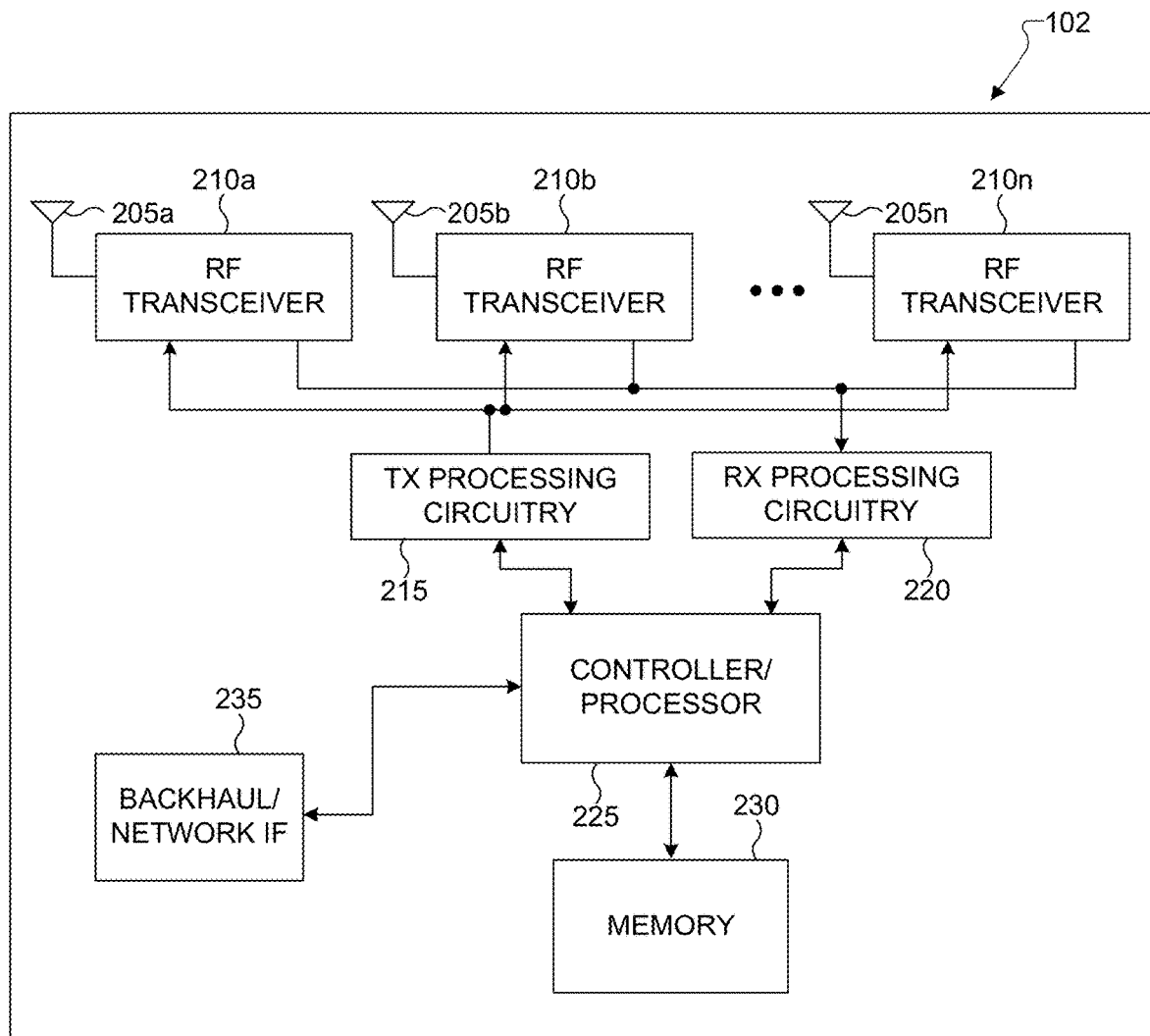
FIG. 2 illustrates an example gNB according to embodiments of the present disclosure.
Figure 3:
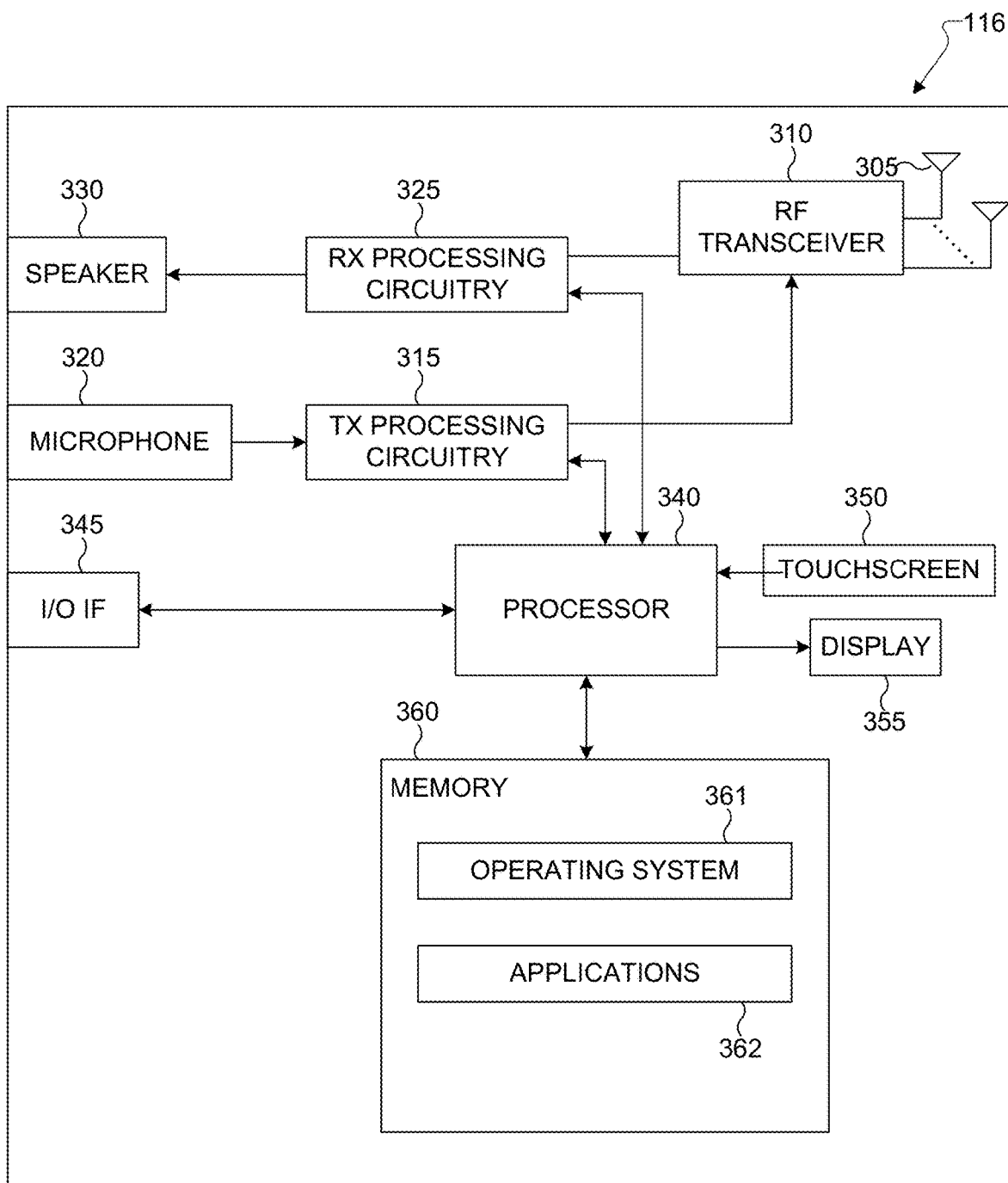
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information about L uplink (UL) reference signals (RSs), M downlink (DL) RSs, and a calibration report, where the L UL RSs are associated with the M DL RSs; transmitting the UL RSs according to the configuration information; measuring the DL RSs; determining, based on the measured DL RSs and a reference DL RS, calibration information; and transmitting the calibration report including the calibration information. One or more of the gNBs 101-103 includes circuitry, programing, or a combination thereof, for generating configuration information about L uplink (UL) reference signals (RSs), M downlink (DL) RSs, and a calibration report, where the L UL RSs are associated with the M DL RSs; transmitting the configuration information; receiving the UL RSs; and receiving the calibration report including calibration information, wherein the calibration information is based on measured DL RSs and a reference DL RS.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of DL channel signals and the transmission of UL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information about L uplink (UL) reference signals (RSs), M downlink (DL) RSs, and a calibration report, where the L UL RSs are associated with the M DL RSs; transmitting the UL RSs according to the configuration information; measuring the DL RSs; determining, based on the measured DL RSs and a reference DL RS, calibration information; and transmitting the calibration report including the calibration information. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
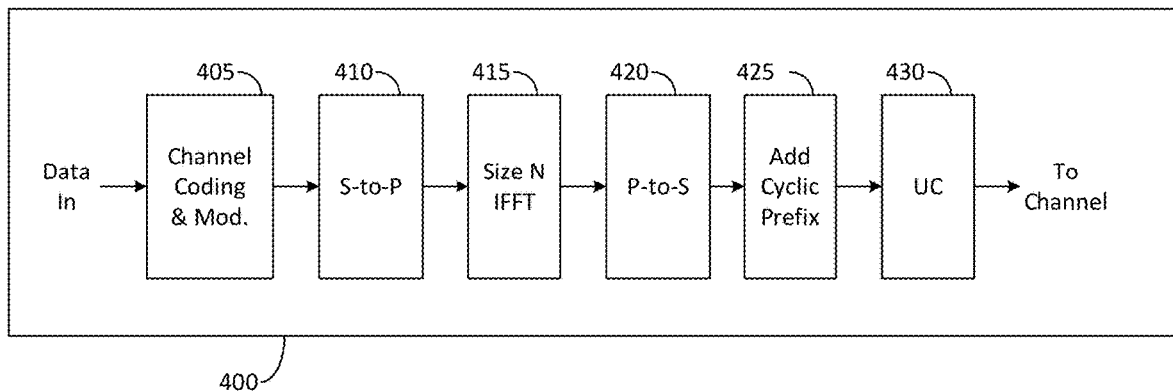
FIG. 4A illustrates a high-level diagram of an orthogonal frequency division multiple access transmit path according to embodiments of the present disclosure.
Figure 4B:
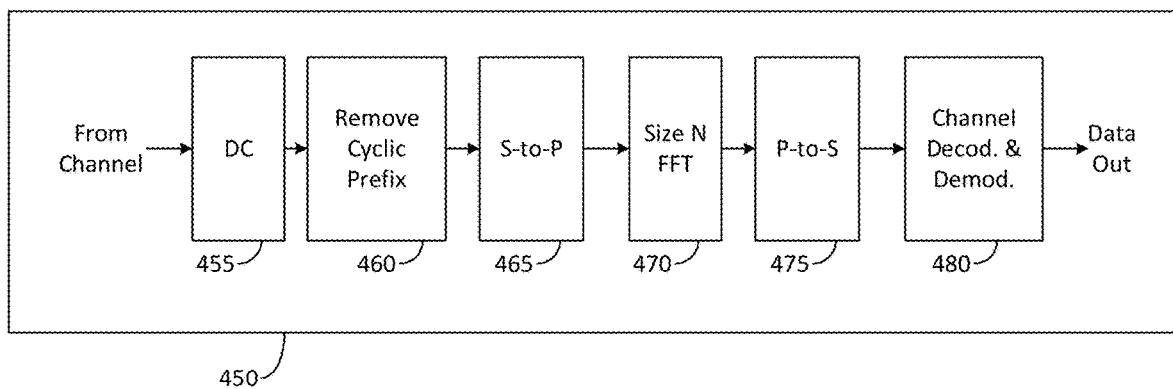
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s=(n_{s0}+y \cdot N_{EPDCCH})$ mod D RBs for a total of $Z=O_F+\lfloor(n_{s0}+y \cdot N_{EPDCCH})/D\rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2(N_{symb}^{UL}-1)-N_{SRS}$, where $N_{SRS}=1$ if a last subframe symbol is used to transmit SRS and $N_{SRS}=0$ otherwise.

Figure 5:
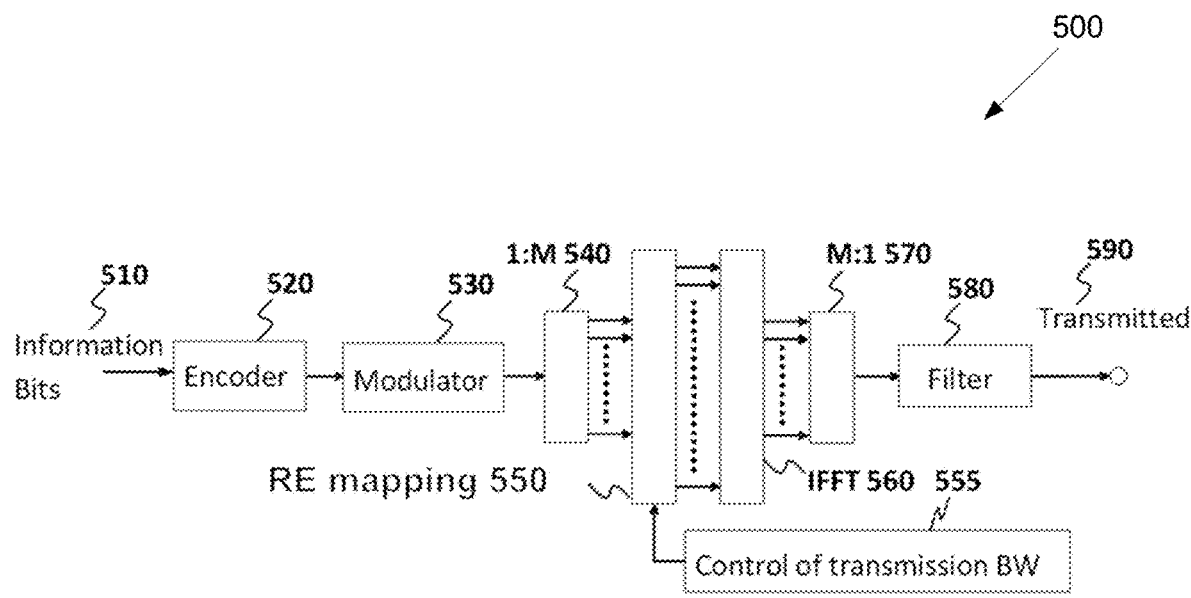
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
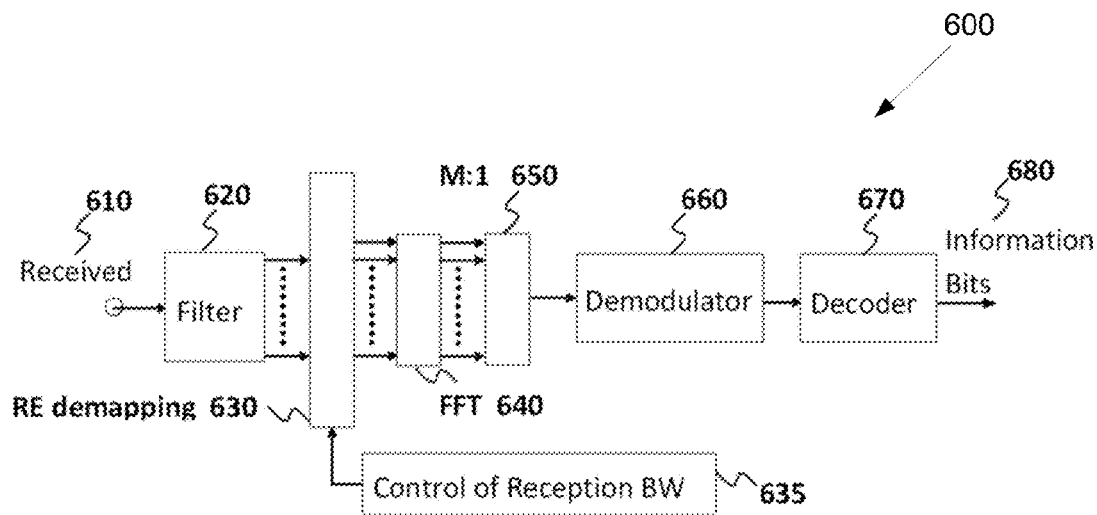
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
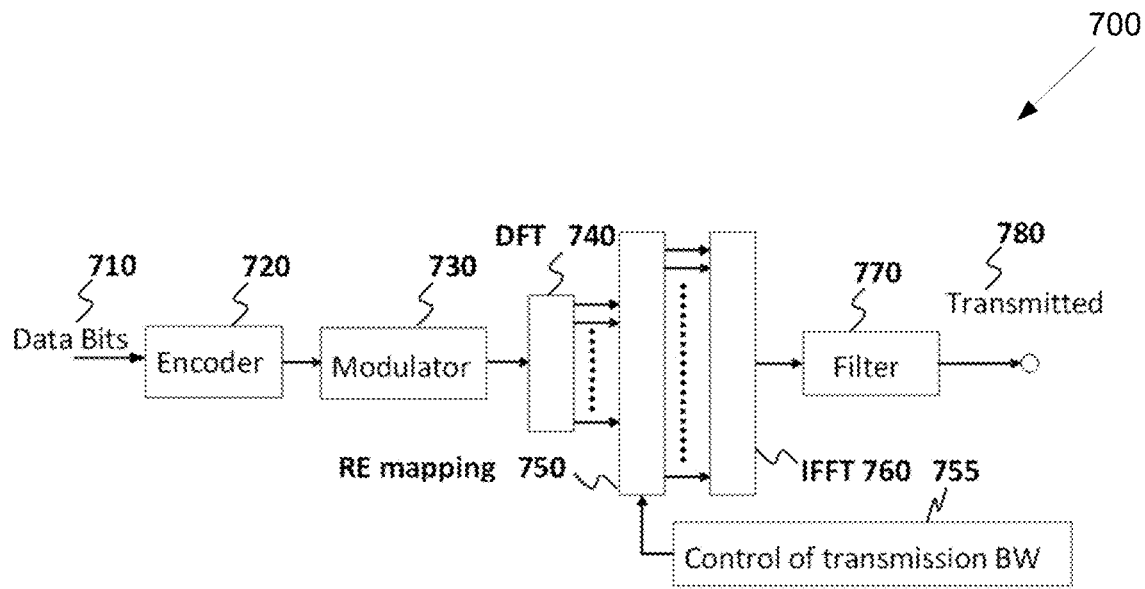
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
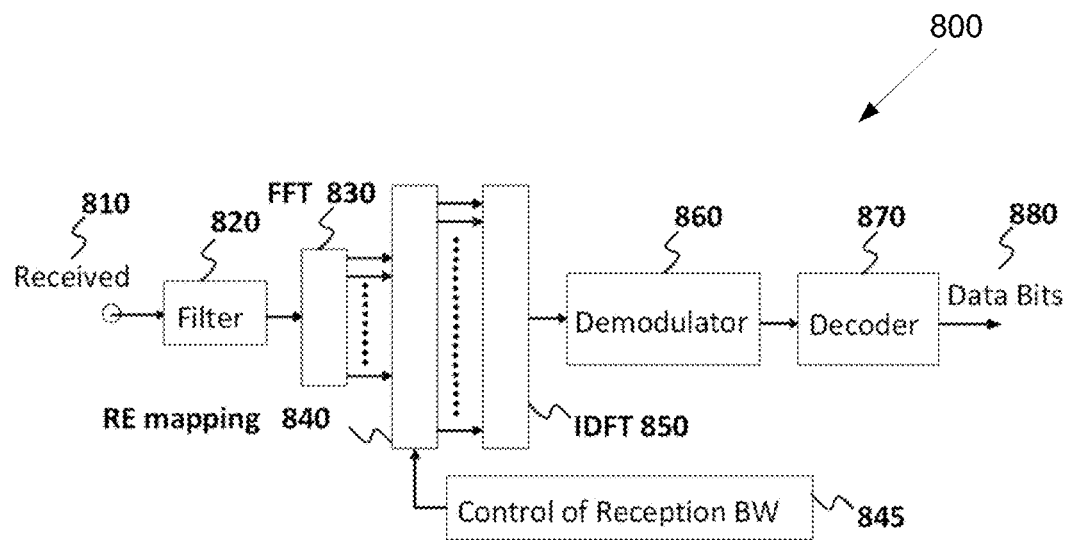
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
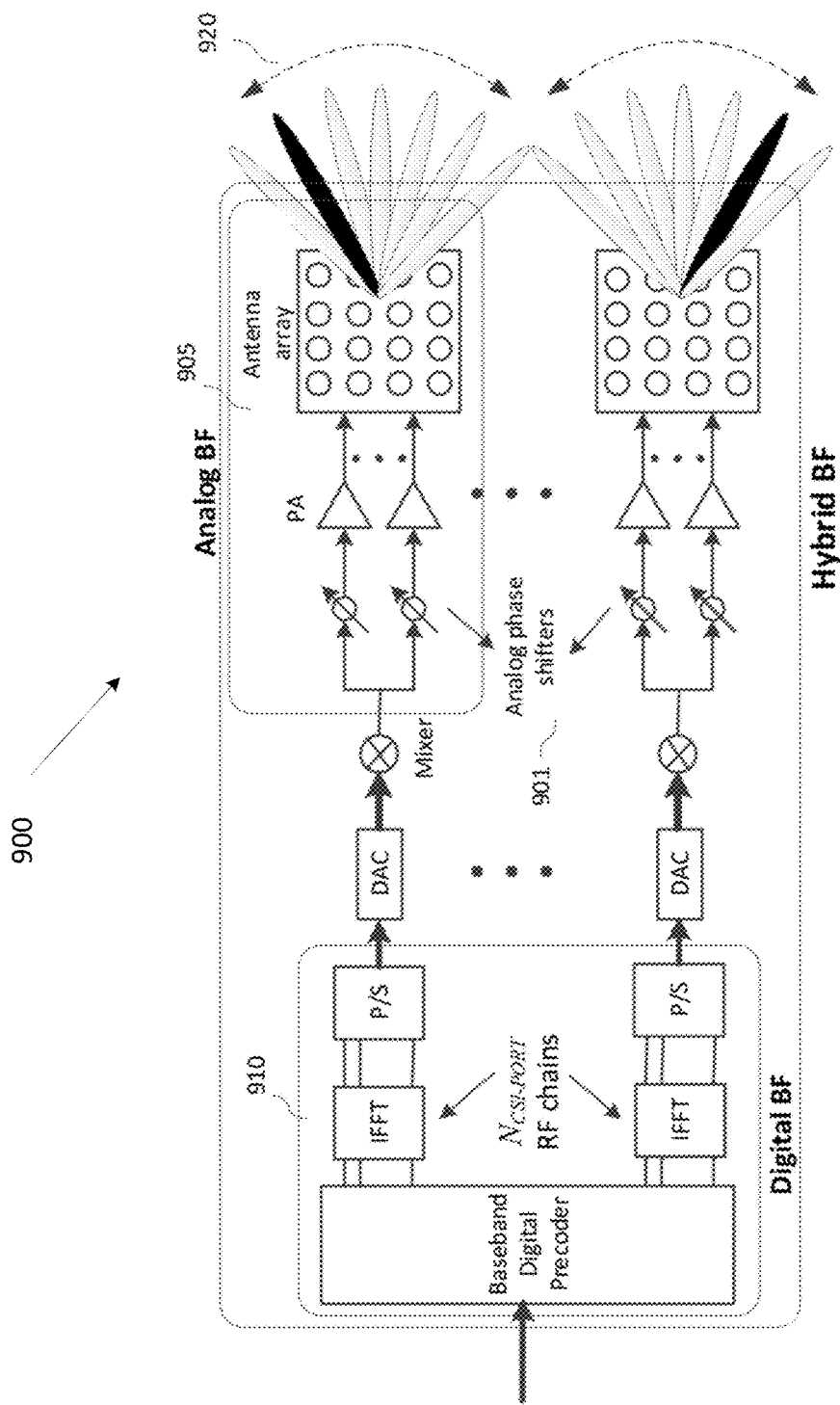
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

Rel.14 LTE and Rel.15 NR specifications support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6GHz (also termed the FR4). In this case, the system can employ only analog beams. Due to the O2 absorption loss around 60GHz frequency (~10dB additional loss@100m distance), larger number of and sharper analog beams (hence larger number of radiators in the array) will be needed to compensate for the additional path loss.

At lower frequency bands such as FR1 or particularly sub-1 GHz band, on the other hand, the number of antenna elements cannot be increased in a given form factor due to large wavelength. As an example, for the case of the wavelength size (A) of the center frequency 600 MHz (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, becomes very large in such low frequency bands, and it leads to the difficulty of deploying 2-D antenna arrays within the size of a conventional form factor. This can result in a limited number of physical antenna elements and, subsequently CSI-RS ports, that can be supported at a single site and limit the spectral efficiency of such systems.

In one embodiment, this disclosure considers a distributed MIMO system, and proposes a concept of MIMO, namely modularized MIMO, which is an evolution path of distributed MIMO, and provides several components to support modularized MIMO operations. In this disclosure, several components including antenna structure configuration, CSI codebook design, advanced CSI reporting, AWL-based channel estimation, and calibration for distributed antennas are proposed to support modular MIMO operations.

The transition from 4G to 5G is being proven as another success in the cellular industry. By the end of 2020, 140 operators in 59 countries (or territories) have launched commercial 5G services [1]. It is expected that the 5G deployment will accelerate considerably over the coming years. In retrospect the lifecycle of past cellular generations, it is the time to incubate technologies for 6G [2].

5G New Radio (NR) achieved various technical advances including the support of different verticals, the network slicing, and the use of mmWave bands, just to name a few. From multiple-input multiple-output (MIMO) antenna technology perspectives, NR defined a series of beam management operations for hybrid beamforming in mmWave band. Admittedly, the MIMO for sub-6 GHz has been redefined largely based on the previous generation Long Term Evolution (LTE) system, and the technical advances fall short compared to mmWave band.

As the cellular industry continuously pushes the boundary of its operating frequency to acquire even wider bandwidth, it is expected that 6G will further embrace THz bands extending 5G mmWave technology. However, it is also expected that the importance of sub-6 GHz band, as an anchor carrier to high frequency bands, will become even more significant due to the limited cell coverage and lower connection reliability at high frequency bands, as witnessed from 5G deployment. On the other hand, low band can easily become a bottleneck as it is usually paired with multiple high frequency carriers and covers wide area, which results in multiplexing of a large number of user equipment (UE) over relatively smaller bandwidth. Therefore, it is the motivation of this disclosure to share a candidate technology for 6G that can improve the spectral efficiency mainly in sub-6 GHz band.

Full-dimension (FD) MIMO was introduced in LTE Release 13 [3]. The base station antenna port mapping was extended to two-dimension, which allows beamforming in elevation direction in addition to the conventional azimuth direction. It became also possible to control many antenna elements at a reduced complexity with the transceiver unit (TXRU) virtualization for grouping multiple antenna elements into a logical antenna port. With the recent advances of active antenna array technology, the FD-MIMO was designed to support massive MIMO antennas at base station in a computationally efficient manner. NR MIMO was also built on the same technical foundation.

On the other hand, the number of antenna elements that can be integrated on a practically feasible antenna form factor size is substantially restricted at low bands due to the half-wavelength distancing between antenna elements. The size of 4×8 antenna panel at sub-1 GHz carrier frequency can be comparable to the size of MINI cooper, which is impractical in the deployment. This exemplifies the difficulty of exploiting massive MIMO technology in low bands. In this disclosure, we introduce the modular MIMO technology for 6G in which one or multiple basic antenna modules are predefined, and they can flexibly form a single antenna system according to the deployment scenario.

The modular MIMO falls into the category of distributed MIMO (D-MIMO) technology, which has been studied in academia for a while [4]. It is worthwhile to note that the D-MIMO technology is also linked to the notion of cell-free network where a large number of distributed access points, each with a single antenna, form a massive MIMO system [5]. From a standardization point of view, the structured D-MIMO comprised of a limited number of uniform basic antenna modules can be firstly defined. Ultimately, it can be expected that the fully flexible modular MIMO with various basic antenna modules can be standardized towards 6G to achieve the performance benefits of massive MIMO anywhere and in any carrier frequency.

The modular MIMO can be viewed as an evolved form of the structured D-MIMO with various predefined basic antenna modules and flexible combinations of them to build a single antenna system. Several possible basic antenna modules may be used with cross-polarization antennas, a close resemblance to modular blocks. Not only the rectangular antenna modules but also other irregular shapes are possible such as L-shaped antenna module for the installations in the corner of buildings or bow-shaped antenna modules for the installation on the curved building surfaces. The reason why we named this technology as modular MIMO is because numerous challenges in the field deployment can be overcome through the combination of the basic antenna modules, as one can realize various imaginations on the baseplate using just a few modular blocks. Alternatively, antenna panels can be custom-made tailored for a specific deployment scenario but this approach is not scalable. By constructing an antenna system using standardized basic antenna modules, the network deployment cost can be significantly reduced. Moreover, the interoperability between the antenna modules manufactured by different vendors can be achieved.

The modular MIMO is especially beneficial in low bands to achieve the gain of massive MIMO without being constrained by the antenna form factor size. This will be particularly more impactful in low bands as a large number of UEs need to be multiplexed over relatively smaller bandwidth. Moreover, one large antenna panel is aesthetically unpleasant and also can be dangerous with wind gust. On the other hand, by using different shapes of basic antenna modules, a desired number of antenna elements can be attainable in scenarios where it is impossible with conventional single antenna form factor size due to spatial limitations. The modular MIMO antennas can be installed horizontal, vertical, and reverse L-shaped manner on the attachable surface of the building. A group of horizontal antennas and a group of vertical antennas can steer beams in azimuth and elevation directions, respective. Although the example shows modular MIMO on a building, it can be applicable to any place where basic antenna modules can be attached, which will enable various use cases and deployment scenarios for modular MIMO. It is also noted that modular MIMO can lower the deployment cost of 6G network as it gives high degree of freedom to operators in selecting deployable cell sites, which can reduce the cell site leasing fees.

The full flexibility of modular MIMO will be useful regardless of the carrier frequency. In high bands, a single antenna panel can already integrate sufficient number of antenna elements. However, by connecting multiple antenna panels to a single base unit and controlling them at once, not only the deployment cost can be lowered but also the interference management can be more easily done just like a one cell.

In this section, we aim to share views on necessary research efforts to make modular MIMO ready for massive 6G commercialization around 2030 rather than focusing on right next steps to support structured D-MIMO in the current NR standard with incremental specification updates. On the other hand, AI/ML has started to be widely used in cellular communications. In the 6G era, various AI solutions will be supported with a revamped network architecture having native AI support in mind. In this regard, the marriage of modular MIMO and AI can be an interesting 6G research topic.

Antenna structure configuration: The antenna configuration to UE including such as 2D antenna port mapping and the number of panels is a prerequisite for UE to perform the channel measurements and construct CSI report. The structured D-MIMO antenna configuration in terms of these elements would not be much different from the case of NR Type-I MP. For modular MIMO, however, the antenna configuration cannot be done in the conventional way due to the use of different antenna modules and numerous combinations of them. Therefore, a certain level of abstraction for configuring antenna structure would be needed. One way of abstracting could be to only configure the indices and numbers of used basic antenna modules, and the collocation information amongst them. The UE can be configured with four collocation groups, each containing a different combination of antenna modules. In addition, a rotation of each antenna modules can be indicated to UEs since it can have different CSI structure in relation to other antenna modules in the same collocation group.

CSI codebook design: The NR Type-I MP codebook was designed under the assumption that all panels are co-located within a fixed structure and, thus, the beam selection was set to be common for all the panels with additional inter-panel co-phasing only; This restriction cannot meet the requirement of modular MIMO. More specifically, not only the shape and the facing direction can be different between the antenna modules but also the distancing between them can be irregular. As a result, the modular MIMO codebook is required to support flexible beam selection across different antenna modules, along with inter-panel phase and power imbalance compensation. One simple extension could be to allow separate basis selection for each antenna modules and to report channel coefficients for each basis vector along with inter-panel phase and amplitude adjustment factors. However, the feedback amount will be overwhelming as separate CSI is sent for each and every panel. One option could be to exploit the correlations across antenna modules. For example, by utilizing the collocation information configured by the network, a UE can be allowed to select common beams among collocated antenna modules to suppress the amount of CSI feedback while minimizing the CSI inaccuracy. Additionally, introducing another basis to compress the CSI using correlations among collocated panels could help to reduce the amount of CSI feedback. On the other hand, AI based comprehensive CSI reduction can be one future direction compared to existing approach of compressing CSI in certain specified domains, i.e., spatial and frequency domain bases in NR Type-II, as such explicit method may not work well with non-uniform antenna structure and irregular antenna spacing. One example approach is CsiNet introduced in [7], which is an application of autoencoder for CSI compression and reconstruction.

Dynamic antenna module selection: One practical approach to reduce the amount of feedback is to send CSI only for a subset of antenna modules with favorable channel status, which we call dynamic antenna module selection (DAS). Through DAS, the diversity from different antenna modules can be fully exploited and, at the same time, the amount of CSI feedback can be opportunistically reduced by sending feedback for a subset of antenna modules having dominant channel qualities. The DAS can be performed either at the network or at UEs. When DAS is performed at the network, an optimal antenna subset can be chosen from the measured UL channels at the distributed antenna modules from UEs' SRS transmission based on channel reciprocity. When DAS is performed at UEs, the process shall involve reporting the chosen antenna subset from UE, which requires standard support. As a part of standard procedure, a UE may be configured with criteria for DAS, such as in terms of radio resource management (RRM) metrics, and a signaling mechanism to indicate the chosen antenna subsets. On the other hand, a periodic channel measurement for all the configured antenna modules and a periodic antenna subset selection and feedback can be burdensome, which can be another area where AI can help to make the DAS smart.

Advanced CSI reporting: The CSI reporting can be also enhanced in the time domain. In the case of modular MIMO, the high volume of CSI feedback can be split into several smaller CSI reports. For example, each smaller CSI report could contain the feedback information corresponding to each antenna module or each collocation group. Another approach would be to introduce multi-stage CSI feedback. In this approach, the first-stage CSI feedback can include common CSI part, such as common beam basis or any other common information, and the second-stage CSI can include information specific to each antenna modules, such as quantization values for each basic antenna module or any other module-specific feedback.

AI/ML-based channel estimation: For the conventional FD-MIMO with 2D antenna arrays, the 2D array structure is exploited in designing the CSI codebook, which is nicely formulated into a Kronecker product of the beam vectors for elevation and azimuth antenna arrays; This reduces the complexity of the codebook structure significantly. However, as modeling codebook for modular MIMO itself is not straightforward, one can conceive to estimate the MIMO channel using AI/ML approach, not based on fixed codebook structure. There can be certain relationship between DL channels of panels if they are collocated, and such relationship could be learnt at the network using AI/ML approach. In this case, rather than reporting CSI for all the panels, it could be enough for UE to report the CSI corresponding to the most representative panel, and the network can infer the CSI of other panels through learning. To this end, the network needs to learn the DL channel relationship between antenna modules in a UE-specific manner. For this, a learning assistance information can be sent from UE to the network, which can be, for instance, a certain form of reward value for a reinforcement learning at the network. On the other hand, the channel reciprocity is usually not assumed in FDD spectrum due to the frequency gap between DL and UL. Recently, however, there are research efforts to estimate FDD DL channel from UL channel using AI/ML approach [6] even though the channel reciprocity is usually not assumed in the FDD spectrum due to the frequency gap between DL and UL. Considering the challenge of defining structured codebook for modular MIMO, an AI/ML-based channel estimation can be useful in low band in which there exists many FDD spectrum bands.

Calibration for distributed antennas: Calibration is another important issue not only for modular MIMO but also for the D-MIMO in general. Massive MIMO base stations use an on-board coupling network and calibration circuits, which we will refer to as the on-board calibration for brevity, to measure the gain and phase differences among transceivers in the same radio frequency (RF) unit in order to maintain the reciprocity between DL and UL channels in the TDD system. For the on-board calibration, one RF chain corresponding to one antenna port serves as a reference to other RF chains for other antenna ports. In the case of the DMIMO, such reference transceiver's signal needs to be shared between distributed modules, which are physically far apart. Using RF cables to distribute the reference is not preferable as it limits the deployment scenarios. In the D-MIMO, the use of different local oscillators (LOs) between distributed antenna modules imposes even more challenges in achieving calibration as the phase of LOs could drift. Periodic calibration is needed to compensate for the phase drift. One can consider to feed common LO signal to distributed antennas but again, the distribution of LO signal over RF cables can be lossy.

As noted, reciprocity calibration is critical for TDD systems but it becomes an issue even for FDD D-MIMO systems. In FDD systems, the DL transmission is precoded based on the CSI feedback from the UE which already captures all the RF impairments as a part of the channel. However, this is applicable for UE-specific data channels only, for which there exists CSI feedback, but not applicable for the transmission of common control signals or reference signals. As the latter is not based on the CSI feedback from UEs, it is difficult to effectively create a beam harmoniously between the modules if the distributed modules are not calibrated with each other and have random phases and gains. In this regard, a standardized procedure for a UE-assisted calibration can be defined, in which a UE feeds back samples of DL channel coefficients to the base station to match with UL channel coefficients measured from UEs' SRS transmission. In addition, an AI/ML approach can be considered to reduce the amount of feedback. For instance, a UE can learn the optimal frequency domain density, e.g., one every other integer number of subcarriers, for DL channel coefficient feedback.

Other components: There will be numerous other research directions that might be out of the scope of standardization. Issues such as efficient channel estimation, precoding design, and smart scheduler design will remain important. Pilot training overhead reduction can become more important for modular MIMO with supplemental AI/ML approaches to keep the channel estimation performance remains intact. These are research directions, just to name a few.

Calibration is an important issue for distributed MIMO in general. Massive MIMO base stations use an on-board coupling network and calibration circuits, which we will refer to as the on-board calibration for brevity, to measure the gain and phase differences among transceivers in the same radio frequency (RF) unit in order to maintain the reciprocity between DL and UL channels in the TDD system. For the on-board calibration, one RF chain corresponding to one antenna port serves as a reference to other RF chains for other antenna ports. In the case of the distributed MIMO, such reference transceiver's signal needs to be shared between distributed RRHs/panels/modules, which are physically far apart. Using RF cables to distribute the reference is not preferable as it limits the deployment scenarios. In the distributed MIMO, the use of different local oscillators (LOs) between distributed antenna modules imposes even more challenges in achieving calibration as the phase of LOs could drift. Periodic calibration is needed to compensate for the phase drift as well.

In one embodiment, this disclosure proposes over-the-air (OTA) signaling mechanisms for calibration among the RRHs/panels of distributed MIMO networks. One of the proposed mechanisms comprises 1) UL RS transmission and UL channel estimation, 2) (beamformed) DL RS transmission/reception based on UL channel estimation and calibration coefficient estimation, 3) calibration coefficient reporting, and 4) codebook design for calibration coefficients. The other one of proposed mechanisms consists of 1) DL RS transmission/reception and 2) UL RS transmission based on DL channel estimation. By using the proposed mechanisms, NW can utilize DL and UL channel reciprocity at multiple panels/RRHs far away and design any coherent beamforming for data transmission from the multiple panels/RRHs.

Figure 10:
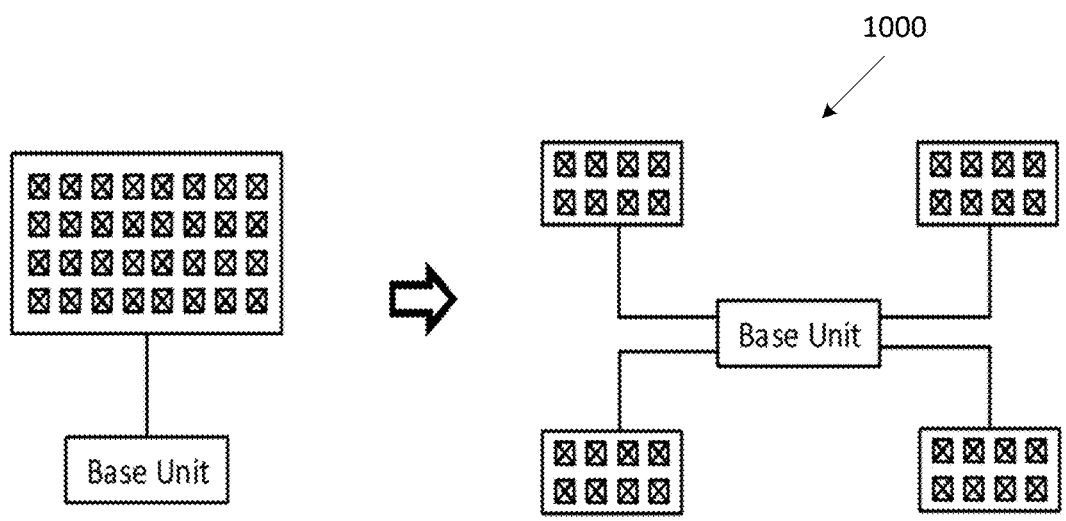
FIG. 10 illustrates an example D-MIMO system according to embodiments of the present disclosure.

FIG. 10 illustrates an example system for D-MIMO 1000 according to embodiments of the present disclosure. The embodiment of the example system for D-MIMO 1000 illustrated in FIG. 10 is for illustration only. FIG. 10 does not limit the scope of this disclosure to any particular implementation of the example system for D-MIMO 1000.

Figure 18:
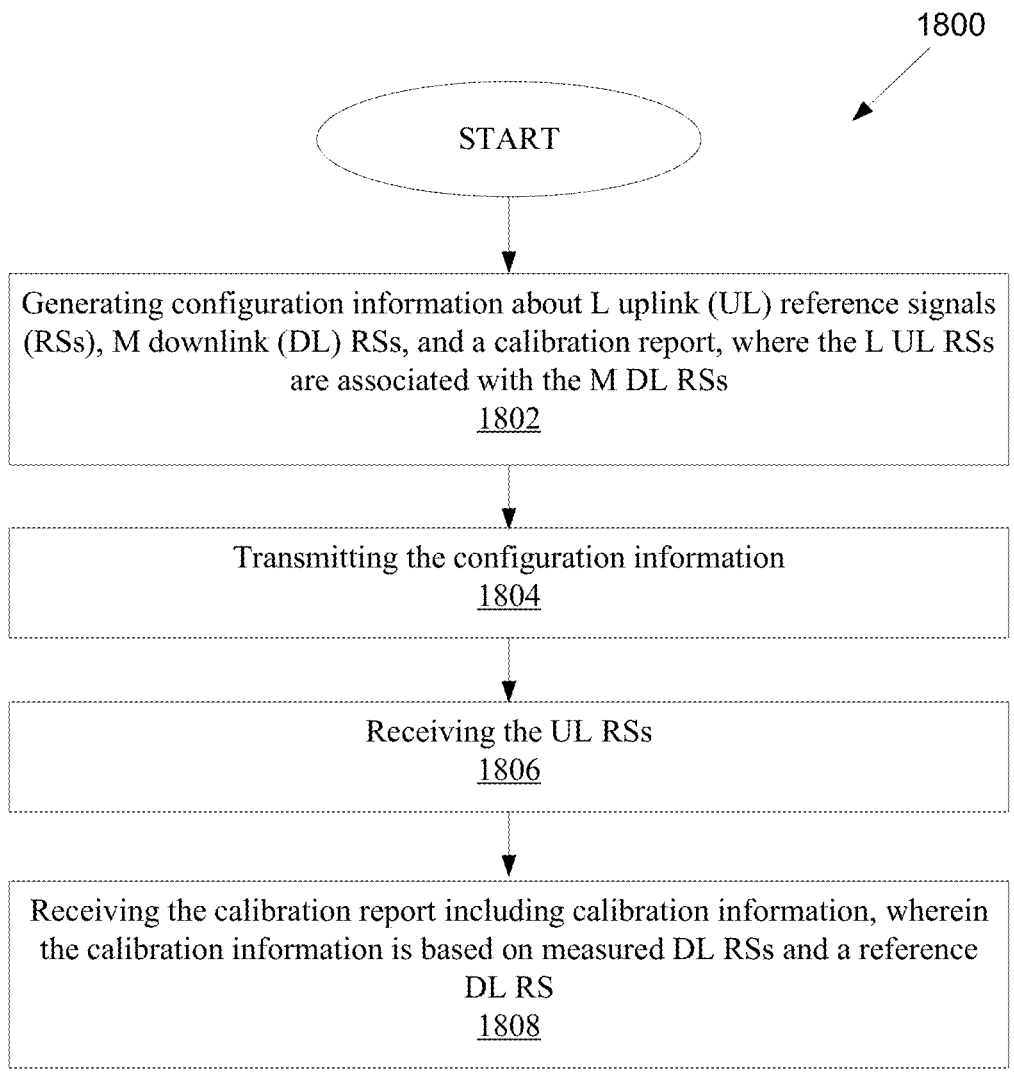
FIG. 18 illustrates a flow chart of a method for operating a BS according to embodiments of the present disclosure.

As illustrated in FIG. 10, one approach to resolve the issue described above is to form multiple antenna panels (e.g., antenna modules, RRHs) with a small number of antenna ports instead of integrating all of the antenna ports in a single panel (or at a single site) and to distribute the multiple panels in multiple locations/sites (or RRHs), as illustrated in FIG. 18.

Figure 11:
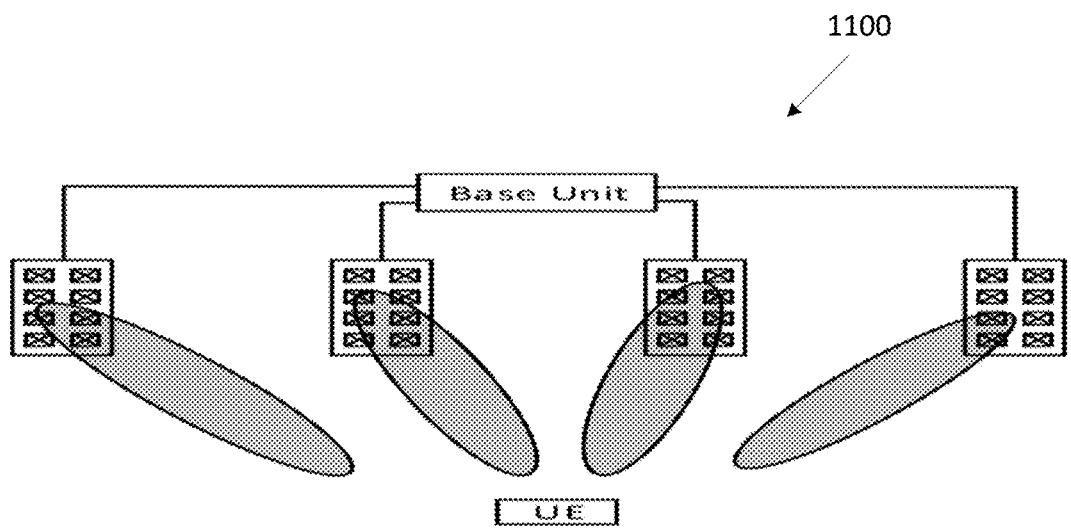
FIG. 11 illustrates an example D-MIMO system according to embodiments of the present disclosure.

FIG. 11 illustrates an example system for D-MIMO 1100 according to embodiments of the present disclosure. The embodiment of the example system for D-MIMO 1100 illustrated in FIG. 11 is for illustration only. FIG. 11 does not limit the scope of this disclosure to any particular implementation of the example system for D-MIMO 1100.

As illustrated in FIG. 11, the multiple antenna panels at multiple locations can still be connected to a single base unit, and thus the signal transmitted/received via multiple distributed panels can be processed in a centralized manner through the single base unit. In another embodiment, it is possible that multiple distributed antenna panels are connected to more than one base units, which communicates with each other and jointly supporting single antenna system.

In TDD, a common approach to acquire DL channel state information is to exploit UL channel estimation through receiving UL RSs (e.g., SRS) sent from the UE. By using the channel reciprocity in TDD systems, the UL channel estimation itself can be used to infer DL channels. This favorable feature enables the NW to reduce the training overhead significantly. However, due to the RF impairment at the transmitter and the receiver, directly using the UL channels for DL channels is not accurate and it requires a calibration process (periodically) among receive and transmit antenna ports of the RF network at the NW. In general, the NW has an on-board calibration mechanism in its own RF network to calibrate its antenna panels having a plurality of receiver/transmitter antenna ports, to enable DL/UL channel reciprocity in channel acquisition. The on-board calibration mechanism can be performed via small-power RS transmission and reception from/to the RF antenna network of the NW and thus it can be done by the NW's implementation in a confined manner (i.e., that does not interfere with other entities). However, it becomes difficult to perform the on-board calibration in distributed MIMO systems due to the distribution of the panels/RRHs over a wide region, and thus it will require over-the-air (OTA) signaling mechanisms to calibrate receive/transmit antenna ports among multiple RRHs/panels far away in distributed MIMO.

This disclosure proposes UE-assisted calibration mechanisms for distributed MIMO systems. Although low-band TDD systems are exemplified for motivation purposes, the present disclosure can be applied to any frequency band in FR1 and/or FDD systems.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI or calibration coefficient reporting can be defined in terms of frequency "subbands" and "CSI reporting band" (CRB), respectively.

A subband for CSI or calibration coefficient reporting is defined as a set of contiguous PRBs which represents the smallest frequency unit for CSI or calibration coefficient reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI or calibration coefficient reporting setting.

"CSI or calibration coefficient reporting band" is defined as a set/collection of subbands, either contiguous or non-contiguous, wherein CSI or calibration coefficient reporting is performed. For example, CSI or calibration coefficient reporting band can include all the subbands within the DL system bandwidth. This can also be termed "full-band". Alternatively, CSI or calibration coefficient reporting band can include only a collection of subbands within the DL system bandwidth. This can also be termed "partial band".

The term "CSI or calibration coefficient reporting band" is used only as an example for representing a function. Other terms such as "CSI or calibration coefficient reporting subband set" or "CSI or calibration coefficient reporting bandwidth" can also be used.

In terms of UE configuration, a UE can be configured with at least one CSI or calibration coefficient reporting band. This configuration can be semi-static (via higher-layer signaling or RRC) or dynamic (via MAC CE or L1 DL control signaling). When configured with multiple (N) CSI or calibration coefficient reporting bands (e.g. via RRC signaling), a UE can report CSI associated with n ≤N CSI reporting bands. For instance, >6GHz, large system bandwidth may require multiple CSI or calibration coefficient reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for all the Mn subbands within the CSI reporting band. A CSI parameter is configured with "subband" for the CSI reporting band with Mn subbands when one CSI parameter is reported for each of the Mn subbands within the CSI reporting band.

Figure 12:
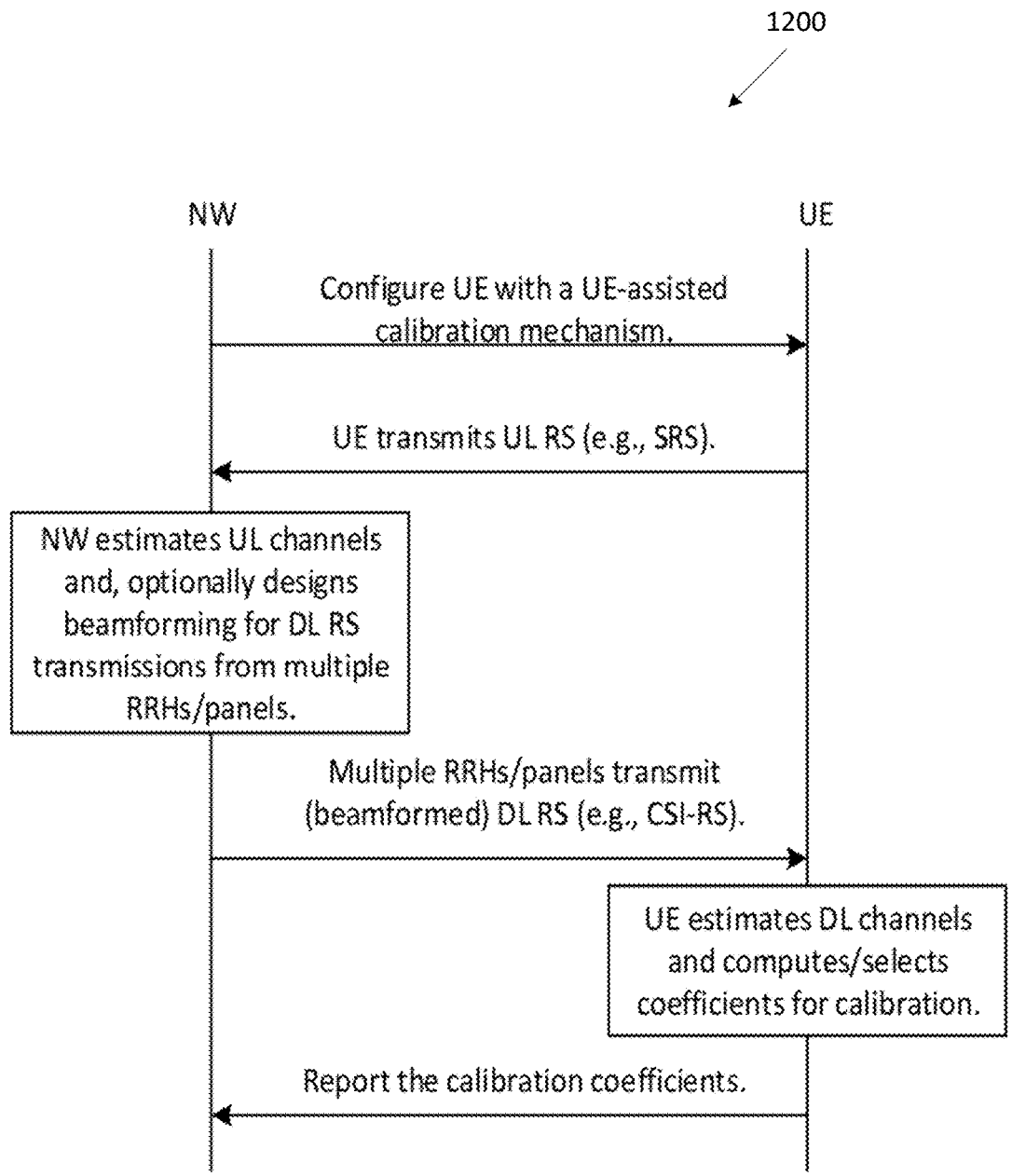
FIG. 12 illustrates a flow diagram of an example signal flow for the UE-assisted calibration mechanism according to embodiments of the present disclosure.

FIG. 12 illustrates a flow diagram of an example signal flow for the UE-assisted calibration mechanism 1200 according to embodiments of the present disclosure. The embodiment of the signal flow for the UE-assisted calibration mechanism 1200 illustrated in FIG. 12 is for illustration only. FIG. 12 does not limit the scope of this disclosure to any particular implementation of the signal flow for the UE-assisted calibration mechanism 1200.

In one embodiment I, a UE is configured with a "UE-assisted calibration mechanism", wherein the UE is configured to perform UL RS transmission(s), perform DL RS reception(s), and/or report calibration-related coefficients for calibration among multiple RRHs/panels of NW. The multiple RRHs/panels can be associated with one base station (gNB) or, optionally, with more than one base stations (gNBs). This configuration can be performed via higher-layer (RRC) signaling. Optionally, DL RS reception and calibration coefficient reporting can be dynamically triggered via L1 or L2 signaling (PDCCH or MAC-CE).

The three steps depicted in the flow diagram illustrated in FIG. 12 (UE transmission of UL RS, UE reception of DL RS, and UE reporting of calibration-related coefficients) can be configured or activated jointly. Optionally, at least one of the three steps can be configured or activated separately. Optionally, all the three steps can be configured or activated separately. For instance, the UE can be configured or triggered (in case of semi-persistent and aperiodic SRS) to transmit SRS separately (as it normally is). But the reception of the DL RS (such as aperiodic CSI-RS) can be configured and/or triggered jointly with the reporting of the calibration-related coefficients. In one example, this joint triggering can be performed via one or more dedicated triggering states (higher-layer configured) using the CSI request DCI field.

In one embodiment I.1, the UE is configured to transmit one or multiple UL RSs (e.g., SRS) for NW to estimate UL channels. Multiple RRHs/panels of NW can estimate UL channels via the UL RS reception. In one example, uplink channels for a given resource (e.g., RE/RB/RBG or any other given resource unit) that are estimated at each RRH/panel i can be expressed as $h_i^{UL}=R_i g_i t^m$, where $R_i$ is an $N_i \times N_i$ diagonal matrix with complex diagonal elements $r_1, \ldots, r_{N_i}$ and indicates the RF impairment at the receiver antenna ports of RRH/panel i, and $g_i$ is an $N_i \times 1$ channel vector for the UL physical propagation channels between UE and RRH/panel i, and $t^m$ is a complex scalar value that corresponds to the RF impairment at a transmitter antenna port of the UE.

Note that in the present disclosure, the case of an antenna port of the UE is considered and it can be extended to the case of multiple antenna ports of the UE by introducing another dimension. (Since this disclosure is targeting to provide methods for calibrating distributed antenna panels at NW side, it is enough to consider a single antenna port at UE side.)

Note that the UL channel $h_i^{UL}$ is not the same as the actual UL propagation channels due to the RF impairment of the receiver and transmitter. Note also that the corresponding DL channels can be expressed as $(h_i^{DL})^H = r^m g_i^H T_i$, where $T_i$ is an $N_i \times N_i$ diagonal matrix with complex diagonal elements $t_1, \ldots, t_{N_i}$ and indicates the RF impairment at the transmitter antenna ports of RRH/panel i, and $g_i^H$ is an $1 \times N_i$ channel vector for the DL physical propagation channels between UE and RRH/panel i, and $r^m$ is a complex scalar value that corresponds to the RF impairment at the receiver antenna port of the UE. Here, the DL physical propagation channels are (or can be regarded to be) the same as the UL physical propagation channels within the coherence time in TDD systems.

In one example I.1.1, for each RRH/panel i, NW can compute calibration coefficients $$C_i = \frac{1}{\gamma_i} T_i^{-1} R_i$$

for the antenna ports within the RRH/panel i, where of $y_i \neq 0$ is an arbitrary complex reference value for RRH/panel i, and apply the calibration coefficient matrix in the RF network of RRH/panel i to get a scaled version of DL channel from UL channel, i.e., $$\left(h_i^{UL}\right)^H C_i^{-1} = \gamma_i t^m g_i^H T_i. \quad (1)$$

Note that the calibration coefficients $C_i$ can be computed via on-board calibration per RRH/panel, and $\gamma_i$ is not known to NW.

In one example I.1.2, NW may not have calibration coefficients and not use any calibration coefficients when performing UL channel estimation.

In one example I.1.3, the UE is configured/triggered with L UL RSs or UL RS resource sets (e.g., SRS resource or resource sets). In one example, an RRH can be associated with a collection of SRS ports and associated with one SRS resource. In another example, an RRH can be associated with a collection of SRS resources and can be associated with an SRS resource set.

In one example I.1.3.1, the UE is configured/triggered with L UL RSs or UL RS resource sets (e.g., SRS resource or resource sets), which can be linked with M DL RSs or DL RS resource sets (e.g., CSI-RS resource or resource set). In one example, L=1. In another example, L=$N_{RRH}$, where $N_{RRH}$ is the number of RRHs/panels that NW may want to calibrate. In one example, M=1. In another example, M=L. In another example, M≥L. In another example, M≤L. In another example, M=$N_{RRH}$. Here, the linkage information between UL RS resources/resource sets and DL RS resources/resource sets is incorporated into the UL RS triggering/configuring request, and thus the UE can expect to receive DL RSs/resources sets under the linkage.

In one example I.1.3.2, the UE is configured/triggered with L UL RS resource sets (e.g., SRS resource or resource sets), each of which is linked with (or associated with) a DL RS resource set (e.g., a CSI-RS resource set). Each DL RS resource set could be associated with a different RRH. Here, the linkage information between UL RS resources/resource sets and DL RS resources/resource sets is incorporated into the UL RS triggering/configuring request, and thus the UE can expect to receive DL RSs/resources sets under the linkage.

In one example I.1.3.3, the UE is configured/triggered with L UL RS resource sets (e.g., SRS resource or resource sets), each of which is linked with (or associated with) multiple DL RS resource set (e.g., a CSI-RS resource set). In one example, L=1, and each DL RS resource set could be associated with a different RRH. Here, the linkage information between UL RS resources/resource sets and DL RS resources/resource sets is incorporated into the UL RS triggering/configuring request, and thus the UE can expect to receive DL RSs/resources sets under the linkage.

In one embodiment I.2, based on the UL channel estimation, the NW designs beamforming or precoding for DL RS transmissions from multiple RRHs/panels, and transmits DL RSs using the beamforming, and the UE is configured/ triggered to receive the DL RSs. In one example, the DL RS transmissions are performed within the coherence time of the UL RS transmission beforehand.

In one example I.2.1, the NW performs DL RS transmissions from multiple RRHs/panels each with matched-filter (MF) beamforming, i.e., $w_i \alpha_i = \alpha_i (\gamma_i t^m)^* T_i^H g_i$, based on the UL channel estimation applied with calibration coefficient matrix as shown in eq. (1), where $\alpha_i > 0$ is a real value and (A)* is conjugate of A. The MF beamforming can enable UE to estimate the resultant signal value:

$$\left(h_i^{DL}\right)^H w_i = r^m g_i^H T_i \alpha_i (\gamma_i t^m)^* T_i^H g_i = \alpha_i \gamma_i^* (t^m)^* r^m \left\| T_i^H g_i \right\|^2 \quad (2)$$

for DS RS transmission from RRH/panel i. From the estimation for RRHs/panels i and k, the UE can also estimate the ratio of the resultant signal value for RRH/panel i to the resultant signal value for RRH/panel k for any i≠k:

$$X_{ik} = \frac{\left(h_i^{DL}\right)^H w_i}{\left(h_k^{DL}\right)^H w_k} = \frac{\alpha_i \gamma_i^* \left\| T_i^H g_i \right\|^2}{\alpha_k \gamma_k^* \left\| T_k^H g_k \right\|^2}. \quad (3)$$

Note that the phase of $X_{ik}$ is the same as the phase of $y_i^*/\gamma_k^*$, i.e., $\angle X_{ik} = \angle(\gamma_i^*/\gamma_k^*)$, since $\alpha_i$, $\alpha_k$, $\|T_i^H g_i\|^2$, and $\|T_k^H g_k\|^2$ are real values, where $\angle A$ is the phase of A. This implies that UE can estimate/compute the phase of $\gamma_i^*/\gamma_k^*$.

Note also that if NW designs MF beamforming with $\alpha_i$ and $\Delta_k$ in a proper manner, for example, $\alpha_i = 1/\|\gamma_i t^m g_i^H T_i\|^2$ and $\alpha_k = 1/\|\gamma_k t^m g_k^H T_k\|^2$ (which can be obtained by using UL channel estimation as shown in eq. (1) for i and k, respectively), the eq. (3) can be reduced to:

$$X_{ik} = \frac{\gamma_i^* / \|\gamma_i\|^2}{\gamma_k^* / \|\gamma_k\|^2}. \quad (4)$$

Thus, by taking norm of eq. (4), the UE can estimate/ compute $\|X_{ik}\| = \|\gamma_k\|/\|\gamma_i\|$ in addition to $\angle X_{ik} = \angle(\gamma_i^*/\gamma_k^*)$. Note that $$\gamma_i = \angle X_{ik} \cdot \frac{\gamma_k}{\|X_{ik}\|}.$$

If $\angle X_{ik}$ and $\|X_{ik}\|$ are available to NW, the NW can adjust the calibration coefficient matrix for RRH/panel k using $\angle X_{ik}$ and $\|X_{ik}\|$ to get $$C_{k,i} = \frac{1}{\angle X_{ik} \cdot \frac{\gamma_k}{\|X_{ik}\|}} T_k^{-1} R_k = \frac{1}{\gamma_i} T_k^{-1} R_k$$

and:

$$\left(h_k^{UL}\right)^H C_{k,i}^{-1} = \gamma_i t^m g_k^H T_k. \quad (5)$$

As can be seen in equations (1) and (5), the DL channels from RRHs/panels i and k can be obtained by multiplying the same scaling factor with (1) and (5), respectively, which enables NW to design any coherent precoding for data transmission from the multiple RRHs/panels. The detailed reporting mechanism and codebook design for calibration coefficients, (e.g., $\angle X_{ik}$ and $\|X_{ik}\|$) shall be considered in several embodiments later.

In one example I.2.2, the NW performs DL RS transmissions from multiple RRHs/panels each with beamforming other than MF, such as zero-forcing and MMSE beamforming, and the UE receives the DL RSs and estimates coefficients required for calibration among panels such as $\angle X_{ik}$ and $\|X_{ik}\|$.

In one example I.2.3, the NW performs DL RS transmissions from multiple RRHs/panels without precoding or beamforming. The UE receives the DL RSs and may estimate DL channel coefficients corresponding to each antenna port for RRHs/panels.

In example I.2.4, the UE is triggered or configured with M DL RS resources or DL RS resource sets (e.g., CSI-RS resources or resource sets). In one example, $M=N_{RRH}$, where $N_{RRH}$ is the number of RRHs/panels that the NW may want to calibrate. In one example, an RRH could be a collection of antenna ports and could be associated with one DL RS resource. In another example, an RRH could be associated with multiple DL RS resources and associated with one DL RS resource set. This information can be incorporate into aperiodic DL RS reception (and/or calibration-related coefficient reporting) request.

In one example I.2.4.1, the M DL RS resources/resource sets are linked/associated with M UL RS resources/resource sets (e.g., SRS resources/resource sets) associated with M RRHs. The UE can compute/estimate calibration coefficient based on the linkage information between DL RS resources/resource sets and UL RS resources/resource sets. In one example, the UE can estimate phase/amplitude differences between the CSI of DL RS resource/resource sets associated with RRHs. In another example, the UE may estimate the UL RSRP for the RRH associated with each UL RS resource set based on the configuration and utilize it to compute calibration-related coefficients such as relative amplitude/power ratio between DL RSRPs associated with UL RS resource sets.

In one example I.2.4.2, the M DL RS resources/resource sets are linked/associated with associated with $N_{RRH}$ RRHs. In one example, $M \geq N_{RRH}$. In this example, one or multiple DL RS resources/resource sets are associated with each RRH. In another example, $M \leq N_{RRH}$. In this case, one or multiple RRHs can be associated with each DL RS resource set. The UE can compute/estimate calibration coefficient based on the linkage information between DL RS resources/resource sets associated with RRHs. In one example, the UE can estimate phase/amplitude differences between the CSI of DL RS resource/resource sets associated with RRHs.

In one embodiment I.3, the UE reports coefficients for calibrating multiple RRHs/panels of the NW.

In one example I.3.1, inter-RRH/panel phase coefficients for calibration are reported. For example, $\angle X_{ik}$ is an inter-RRH/panel phase coefficient for calibrating RRHs/panels i and k.

In one example I.3.1.1, there can be a reference RRH/panel index, and the inter-RRH/panel phase coefficients can be computed based on the reference RRH/panel index. For example, the UE computes and reports $\angle X_{01}, \angle X_{02}, \ldots, \angle X_{0(N_{RRH}-1)}$, where $N_{RRH}$ is the number of (configured) RRHs (or panels), under the reference RRH/panel index 0. The reference RRH/panel index can be configured/pre-determined or determined with some rule.

In one example I.3.1.2, the inter-RRH/panel phase coefficients can be computed in a sequential indexing manner. For example, the UE computes and reports $\angle X_{01}, \angle_{12}, \ldots, \angle X_{(N_{RRH}-2)(N_{RRH}-1)}$, where $N_{RRH}$ is the number of (configured) RRHs (or panels). The RRH/panel indices can be configured/pre-determined or determined with some rule.

In one example I.3.1.3, the inter-RRH/panel phase coefficients can be computed for any possible pair. For example, the UE computes and reports $\angle X_{01}, \angle X_{02}, \ldots,$ $\angle X_{(N_{RRH}-2)(N_{RRH}31\ 1)}$, where $N_{RRH}$ is the number of (configured) RRHs (or panels). The RRH/panel indices can be configured/pre-determined or determined with some rule.

In one example I.3.2, inter-RRH/panel phase and amplitude coefficients for calibration are reported. For example, $\angle X_{ik}$ and $\|X_{ik}\|$ are inter-RRH/panel phase and amplitude coefficients for calibrating RRHs/panels i and k, respectively.

In one example I.3.2.1, there can be a reference RRH/panel index, and the inter-RRH/panel phase and amplitude coefficients can be computed based on the reference RRH/panel index. For example, the UE computes and reports $\angle X_{01}, \angle X_{02}, \ldots, \angle X_{0(N_{RRH}-1)}$ and $\|X_{01}\|, \|X_{02}\|, \ldots, \|X_{0(N_{RRH}-1)}\|$, where $N_{RRH}$ is the number of (configured) RRHs (or panels), under the reference RRH/panel index 0. The reference RRH/panel index can be configured/pre-determined or determined with some rule.

In one example I.3.2.2, the inter-RRH/panel phase and amplitude coefficients can be computed in a sequential indexing manner. For example, the UE computes and reports $\angle X_{01}, \angle X_{12}, \angle X_{(N_{RRH}-2)(N_{RRH}-1)}$ and $\|X_{01}\|, \|X_{12}\|, \ldots, \|X_{(N_{RRH}-2)(N_{RRH}31\ 1)}\|$, where $N_{RRH}$ is the number of (configured) RRHs (or panels). The RRH/panel indices can be configured/pre-determined or determined with some rule.

In one example I.3.2.3, the inter-RRH/panel phase and amplitude coefficients can be computed for any possible pair. For example, the UE computes and reports $\angle X_{01}, \angle X_{02}, \ldots, \angle X_{(N_{RRH}-2)(N_{RRH}1)}$ and $\|X_{01}\|, \|X_{02}\|, \ldots, \|X_{(N_{RRH}-2)(N_{RRH}-1)}\|$, where $N_{RRH}$ is the number of (configured) RRHs (or panels). The RRH/panel indices can be configured/pre-determined or determined with some rule.

In one example I.3.2.4, the UE computes/finds the RRH/panel index i* corresponding to the largest/smallest magnitude of the reference value $\gamma_i^*$ among the configured RRHs/panels, and reports $\{\angle X_{i^*k}\}_{k \neq i^*}$ and $\{\|X_{i^*k}\|\}_{k \neq i^*}$, where $N_{RRH}$ the number of (configured) RRHs (or panels). In one example, the UE reports the computed/founded index i*, and optionally reports k corresponding to each $\angle X_{i^*k}$ (or $\|X_{i^*k}\|$).

In one example I.3.3, inter-RRH/panel phase and power coefficients for calibration are reported. For example, $\angle X_{ik}$ and $\|X_{ik}\|^2$ are inter-RRH/panel phase and power coefficients for calibrating RRHs/panels i and k, respectively.

In one example I.3.3.1, there can be a reference RRH/panel index, and the inter-RRH/panel phase and power coefficients can be computed based on the reference RRH/panel index. For example, the UE computes and reports $\angle X_{01}, \angle X_{02}, \ldots, \angle X_{0(N_{RRH}-1)}$ and $\|X_{01}\|^2, \|X_{02}\|^2, \ldots, \|X_{0(N_{RRH}-1)}\|^2$, where $N_{RRH}$ is the number of (configured) RRHs (or panels), under the reference RRH/panel index 0. The reference RRH/panel index can be configured/pre-determined or determined with some rule.

In one example I.3.3.2, the inter-RRH/panel phase and power coefficients can be computed in a sequential indexing manner. For example, the UE computes and reports $\angle X_{01}, \angle X_{12}, \ldots, \angle X_{(N_{RRH}-2)(N_{RRH}-1)}$ and $\|X_{01}\|^2, \|X_{12}\|^2, \ldots, \|X_{(N_{RRH}-2)(N_{RRH}-1)}\|^2$, where $N_{RRH}$ is the number of (configured) RRHs (or panels). The RRH/panel indices can be configured/pre-determined or determined with some rule.

In one example I.3.3.3, the inter-RRH/panel phase and power coefficients can be computed for any possible pair. For example, the UE computes and reports $\angle X_{01}, \angle X_{02}, \ldots, \angle X_{(N_{RRH}-2)(N_{RRH}-1)}$ and $\|X_{01}\|^2, \|X^{02}\|^2, \ldots, \|X_{(N_{RRH}-2)(N_{RRH}-1)}\|^2$, where $N_{RRH}$ is the number of (configured) RRHs (or panels). The RRH/panel indices can be configured/pre-determined or determined with some rule.

In one example I.3.4, output values of functions of inter-RRH/panel phase and amplitude (power) coefficients for calibration are reported. For example, $f(\angle X_{ik})$ and $g(\|X_{ik}\|)$ are reported, where $f(x)=x$ and $$g(x) = \frac{1}{x}.$$

The reported pairs can be chosen similar to the above examples.

In one example I.3.5, coefficients for calibration can be values other than inter-RRH/panel phase/amplitude/power coefficients. For example, the UE is configured to report each DL channel coefficient corresponding to each antenna (CSI-RS) port for each RRH/panel. In this case, the feedback overhead for reporting coefficients for calibration would be huge. Thus, the UE may be further configured to report the coefficients in a wideband level or for a specific subband/RE/RBG to minimize the feedback overhead.

In one example I.3.6, coefficients for calibration can be reported in a subband level or wideband level or any other granularity level, e.g., RE/PRB/subcarrier. The resource indices (e.g., subband indices) corresponding to the coefficients to be reported for calibration can be configured.

In one embodiment I.4, coefficients for calibration are reported to NW using codebooks. For example, the inter-RRH/panel phase and amplitude (power) coefficients can be quantized according to respective codebooks.

In one example I.4.1, The codebook for the inter-RRH/panel phase (or output of a function of the inter-RRH/panel phase) can be designed similar to the codebook for the phase coefficient in Rel-16 enhanced Type-II codebook.

In one example I.4.2, the codebook for the inter-RRH/panel phase (or output of a function of the inter-RRH/panel phase) is fixed, e.g., 8PSK (3-bit per phase), 16PSK(4-bit per phase), or 256PSK (8-bit per phase). Since the calibration process requires high accuracy, high-resolution quantized codebook can be applied such as 256PSK. In one example, the codebook for the inter-RRH/panel phase is configured, from 8PSK(3-bit per phase to 256PSK (8-bit per phase).

In one example I.4.3, the codebook for the inter-RRH/panel amplitude (or output of a function of the inter-RRH/panel amplitude) is designed similar to the codebook for the amplitude coefficient in Rel-16 enhanced Type-II codebook.

In one example I.4.4, the codebook for the inter-RRH/panel amplitude (or output of a function of the inter-RRH/panel amplitude) is fixed, e.g., 4-bit amplitude codebook. An example is shown as follows:

| 4-bit amplitude codebook | |
|---|---|
| Index | Amplitude |
| 0 | 0 |
| 1 | $\frac{1}{\sqrt{128}}$ |
| 2 | $\left(\frac{1}{8192}\right)^{1/4}$ |
| 3 | $\frac{1}{8}$ |
| 4 | $\left(\frac{1}{2048}\right)^{1/4}$ |
| 5 | $\frac{1}{2\sqrt{8}}$ |
| 6 | $\left(\frac{1}{512}\right)^{1/4}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{1/4}$ |
| 11 | $\frac{1}{2}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 |

In one example I.4.5, the codebook for the inter-RRH/panel amplitude (or output of a function of the inter-RRH/panel amplitude) is fixed, e.g., 3-bit amplitude codebook. An example is shown as follows:

| 3-bit amplitude codebook | |
|---|---|
| Index | Amplitude |
| 0 | 0 |
| 1 | $\frac{1}{8}$ |
| 2 | $\frac{1}{4\sqrt{2}}$ |
| 3 | $\frac{1}{4}$ |
| 4 | $\frac{1}{2\sqrt{2}}$ |
| 5 | $\frac{1}{2}$ |
| 6 | $\frac{1}{\sqrt{2}}$ |
| 7 | 1 |

In one example I.4.6, the codebook for the inter-RRH/panel amplitude (or output of a function of the inter-RRH/panel amplitude) contains elements whose values are larger than 1. Note that the amplitude coefficient for calibration is not guaranteed to be smaller than 1.

An example for the case of 4-bit codebook is shown as follows:

| 4-bit amplitude codebook | |
|---|---|
| Index | Amplitude |
| 0 | 0 |
| 1 | $\frac{2}{\sqrt{128}}$ |
| 2 | $2\left(\frac{1}{8192}\right)^{1/4}$ |
| 3 | $\frac{1}{4}$ |
| 4 | $2\left(\frac{1}{2048}\right)^{1/4}$ |
| 5 | $\frac{1}{\sqrt{8}}$ |
| 6 | $2\left(\frac{1}{512}\right)^{1/4}$ |
| 7 | $\frac{1}{2}$ |
| 8 | $2\left(\frac{1}{128}\right)^{1/4}$ |
| 9 | $\frac{2}{\sqrt{8}}$ |
| 10 | $2\left(\frac{1}{32}\right)^{1/4}$ |
| 11 | 1 |
| 12 | $2\left(\frac{1}{8}\right)^{1/4}$ |
| 13 | $\frac{2}{\sqrt{2}}$ |
| 14 | $2\left(\frac{1}{2}\right)^{1/4}$ |
| 15 | 2 |

In one example I.4.7, the codebook for the inter-RRH/panel power (or output of a function of the inter-RRH/panel power) is fixed, e.g., 4-bit amplitude codebook. An example is the square of the amplitude designed according to example I.4.4.

In one example I.4.8, the codebook for the inter-RRH/panel power (or output of a function of the inter-RRH/panel power) is fixed, e.g., 3-bit amplitude codebook. An example is the square of the amplitude designed according to example I.4.5.

In one example I.4.9, the codebook for the inter-RRH/panel power (or output of a function of the inter-RRH/panel power) contains elements whose values are larger than 1. Note that the power coefficient for calibration is not guaranteed to be smaller than 1. An example is the square of the amplitude designed according to example I.4.6.

Figure 13:
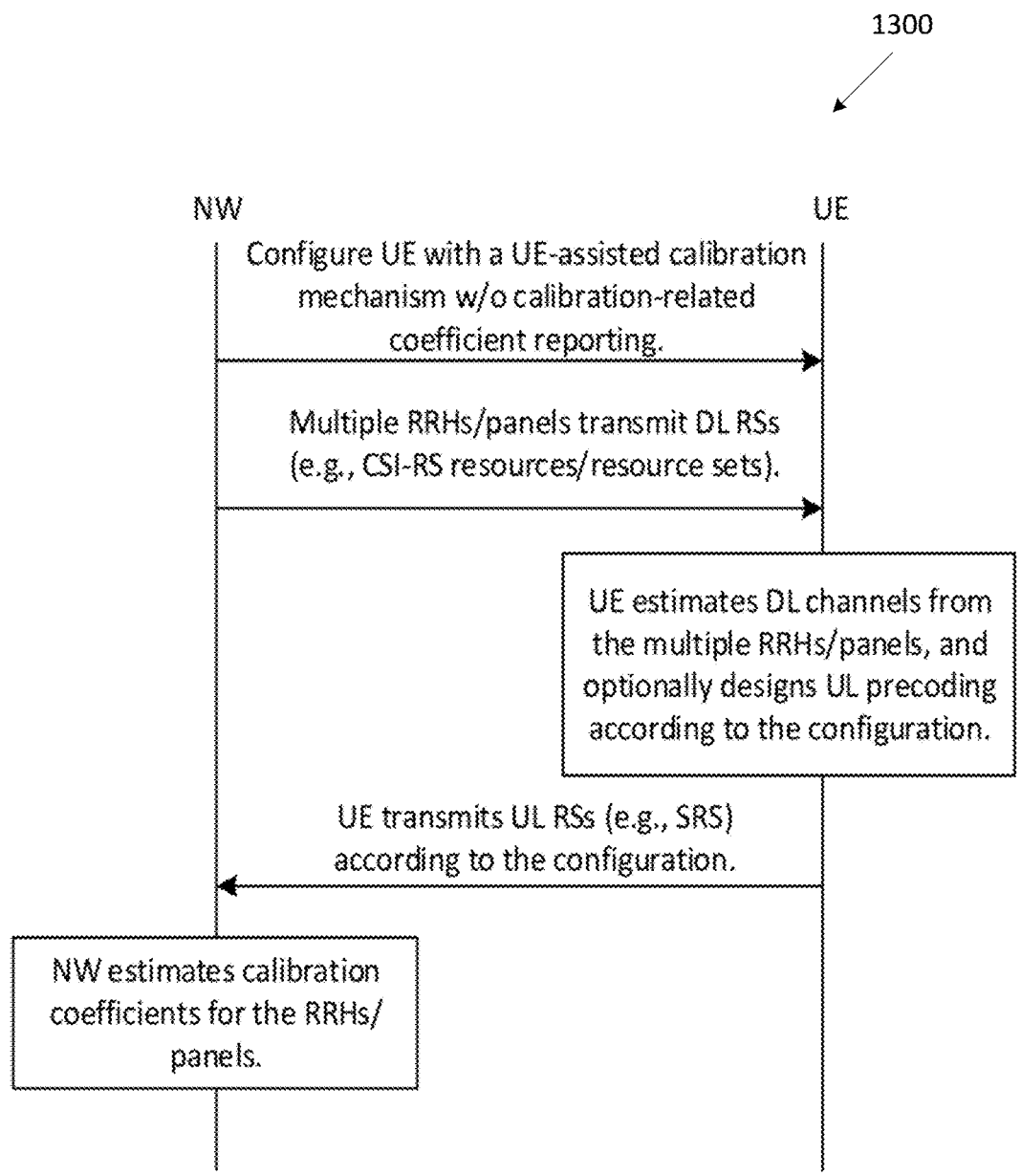
FIG. 13 illustrates a flow diagram of an example signal flow for the UE-assisted calibration mechanism according to embodiments of the present disclosure.

FIG. 13 illustrates a flow diagram of an example signal flow for the UE-assisted calibration mechanism 1300 according to embodiments of the present disclosure. The embodiment of the signal flow for the UE-assisted calibration mechanism 1300 illustrated in FIG. 13 is for illustration only. FIG. 13 does not limit the scope of this disclosure to any particular implementation of the signal flow for the UE-assisted calibration mechanism 1300.

In one embodiment II, a UE is configured with a "UE-assisted calibration mechanism w/o calibration-related coefficient reporting", wherein the UE is configured to perform DL RS reception(s), and to perform UL RS transmission(s) for calibration among multiple RRHs/panels of NW. The multiple RRHs/panels can be associated with one base station (gNB) or, optionally, with more than one base stations (gNBs). This configuration can be performed via higher-layer (RRC) signaling. Optionally, DL RS reception and/or UL RS transmission can be dynamically triggered via L1 or L2 signaling (PDCCH or MAC-CE).

The two steps depicted in the flow diagram illustrated in FIG. 13 (UE reception of DL RS and UE transmission of UL RS) can be configured or activated jointly. Optionally, either one of the two steps can be configured or activated separately. Optionally, all the two steps can be configured or activated separately. For instance, the UE can be configured or triggered (in case of semi-persistent and aperiodic SRS) to transmit SRS separately (as it normally is).

In one embodiment II.1, the UE is triggered or configured with M DL RS resources or DL RS resource sets (e.g., CSI-RS resources or resource sets). In one example, $M=N_{RRH}$, where $N_{RRH}$ is the number of RRHs/panels the NW may want to calibrate. In another example, the UE is configured/triggered with $M=N_{RRH}$ DL RS resource sets wherein each DL RS resource set i contains $N_{RRH,i}$ DL RS resources, each of which is associated with each antenna port at RRH i.

In one example, an RRH could be a collection of antenna ports and could be associated with one DL RS resource. In another example, an RRH could be associated with multiple DL RS resources and associated with one DL RS resource set. This information can be incorporate into aperiodic DL RS reception request.

In one example II.1.1, the M DL RS resources/resource sets associated with M RRHs/panels are linked/associated with M UL RS resources/resource sets (e.g., SRS resources/resource sets). The UE can compute/estimate DL channels associated with M RRHs/panels using DL RS reception. Based on the DL channel estimation, the UE performs UL RS transmissions for each of the RRHs/panels using the associated UL RS resource sets.

In one example II.1.1.1, when performing UL RS transmission for an associated UL RS resource set, the UE uses a certain pre-determined/configured precoding vector/matrix (e.g., MF beamforming) based on the DL channel estimation from the DL RS resource set associated with the UL RS resource set. In one example, a pre-determined beamforming for the UL RS transmission can be configured/indicated in the DL RS reception request (e.g., the CSI request). This procedure enables the NW to compute calibration coefficients between RRHs/panels by comparing the estimated UL channels, when receiving UL RS transmissions via the predetermined beamforming (which is designed based on DL channels) from the UE.

In one example II.1.2, the M DL RS resources/resource sets are linked/associated with associated with $N_{RRH}$ RRHs. In one example, $M \geq N_{RRH}$. In this example, one or multiple DL RS resources/resource sets are associated with each RRH. In another example, M≤$N_{RRH}$. In this case, one or multiple RRHs can be associated with each DL RS resource set.

In one embodiment II.2, the UE is configured to transmit one or multiple UL RSs (e.g., SRS resources/resource sets) for NW to estimate UL channels. Multiple RRHs/panels of NW can estimate UL channels via the UL RS reception In one example II.2.1, the UE is configured/triggered with L UL RSs or UL RS resource sets (e.g., SRS resource or resource sets). In one example, an RRH can be associated with a collection of SRS ports and thus associated with one SRS resource. In another example, an RRH can be associated with a collection of SRS resources and thus can be associated with an SRS resource set.

In one example I.2.1.1, the UE is configured/triggered with L UL RSs or UL RS resource sets (e.g., SRS resource or resource sets), which can be linked with M DL RSs or DL RS resource sets (e.g., CSI-RS resource or resource set). In one example, L=1. In another example, L=$N_{RRH}$, where $N_{RRH}$ is the number of RRHs/panels that NW may want to calibrate. In one example, M=1. In another example, M=L. In another example, M≥L. In another example, M≤L. In another example, M=$N_{RRH}$. Here, the linkage information between UL RS resources/resource sets and DL RS resources/resource sets can be incorporated into the UL RS triggering/configuring request (or the DL RS request or configuration beforehand). In one example, an indication on how to design UL precoding (e.g., MF beamforming) for the associated UL RS transmission (which is linked with DL RS(s) or resource set(s)) is included in the request. In another example, a UL precoding type can be predetermined, for example, MF beamforming based on the associated DL channel estimation. According to the request, the UE performs UL RS transmissions according to the linkage information/configuration.

In one example II.2.1.2, the UE is configured/triggered with L UL RS resource sets (e.g., SRS resource or resource sets), each of which is linked with (or associated with) a DL RS resource set (e.g., a CSI-RS resource set). Each DL RS resource set could be associated with a different RRH. Here, the linkage information between UL RS resources/resource sets and DL RS resources/resource sets is incorporated into the UL RS triggering/configuring request (or the DL RS request or configuration beforehand). In one example, an indication on how to design UL precoding (e.g., MF beamforming) for the associated UL RS transmission (which is linked with DL RS(s) or resource set(s)) is included in the request. In another example, a UL precoding type can be predetermined, for example, MF beamforming based on the associated DL channel estimation. According to the request, the UE performs UL RS transmissions according to the linkage information/configuration.

In one example II.2.1.3, the UE is configured/triggered with L UL RS resource sets (e.g., SRS resource or resource sets), each of which is linked with (or associated with) multiple DL RS resource set (e.g., a CSI-RS resource set). In one example, L=1, and each DL RS resource set could be associated with a different RRH. Here, the linkage information between UL RS resources/resource sets and DL RS resources/resource sets is incorporated into the UL RS triggering/configuring request (or the DL RS request or configuration beforehand). In one example, an indication on how to design UL precoding (e.g., MF beamforming) for the associated UL RS transmission (which is linked with DL RS(s) or resource set(s)) is included in the request. In another example, a UL precoding type can be predetermined, for example, MF beamforming based on the associated DL channel estimation. According to the request, the UE performs UL RS transmissions according to the linkage information/configuration.

In another embodiment, this disclosure proposes NW-based calibration mechanisms among the TRPs/RRHs/panels of distributed MIMO networks. This disclosure defines an entity called 'calibration management function (CMF)' and proposes essential signaling for calibration process between TRPs and CMF such as calibration request/response and messages/information for calibration-related coefficients, which can be specified in front-/mid-/back-haul interfaces, i.e., F1/Xn/Ng interfaces of 3GPP standards.

This disclosure also proposes a mechanism on calibration necessity detection and reporting, wherein UE is configured to measure RSs transmitted from multiple TRPs, to compare the signal qualities of the RSs, to detect calibration necessity based on some measure, and/or to report the status on the calibration necessity.

This disclosure proposes NW-based calibration mechanisms for distributed MIMO systems. Compared to the UE-assisted calibration mechanism that allows control signal exchanges and performs UL/DL RS transmissions/reception between UE and NW, this disclosure considers the scenario where multiple TRPs (or RRHs, panels, RUs, DUs, etc.) are to exchange (control) messages for calibration process with calibration management function via fronthaul-/mid-/back-haul interface, to perform RS transmissions/receptions for computing calibration coefficients, and/or to perform antenna calibration within the RF network of the TRPs.

Figure 14:
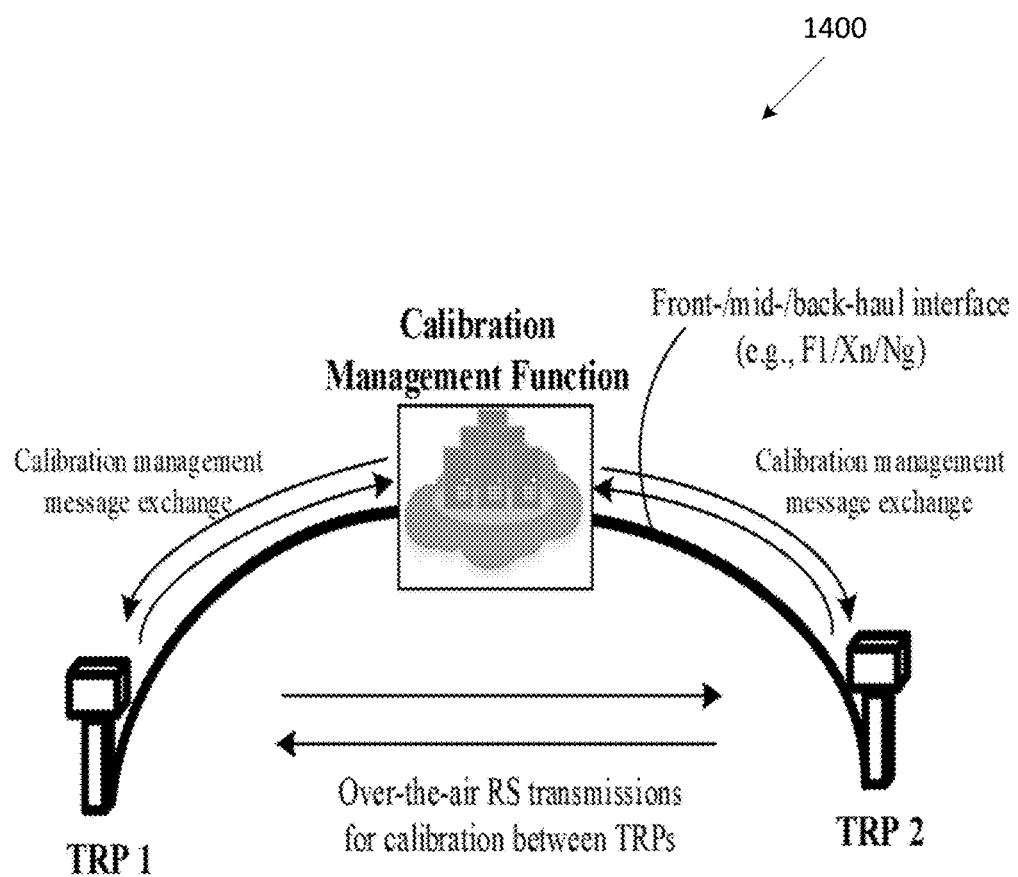
FIG. 14 illustrates a schematic diagram illustrating a network for calibration between TRPs according to embodiments of the present disclosure.

FIG. 14 illustrates a schematic diagram illustrating a network for calibration between TRPs 1400 according to embodiments of the present disclosure. The embodiment of the network for calibration between TRPs 1400 illustrated in FIG. 14 is for illustration only. FIG. 14 does not limit the scope of this disclosure to any particular implementation of the network for calibration between TRPs 1400.

In one embodiment III, the NW performs a calibration process among TRPs with network layer signaling through front-/mid-/back-haul interface such as, e.g., F1/Xn/Ng interface. FIG. 14 illustrates a network for calibration between TRPs to exemplify a scenario considered in this disclosure, where a calibration management function (CMF) and its associated TRPs can exchange calibration management messages through front-/mid-/back-haul interface and perform over-the-air RS transmissions for calibration between antenna panels (active antenna units) of the TRPs.

In one example, the CMF resides in a centralized unit (CU) where higher-layer functionalities such as RRC, PDCP, SDAP are performed, and manages calibration operations among antenna panels of decentralized units (DUs) associated with the CU, which control lower-layer functionalities such as PHY, MAC, and RLC layers. In this case, messages for calibration management can be exchanged via the F1 interface.

In another example, the CMF resides in the DU and manages calibration operations among antenna panels of radio units (RUs) associated with the DU, which, for example, control lower-PHY layers (note that the point where the RU splits among the layers can be different). For example, in this case, messages for calibration management can be exchanged via a fronthaul interface.

In another example, the CMF resides in the core network and manages calibration operations among TRPs through message exchange via the Ng interface.

FIG. 14 is used for illustration only and thus should not be interpreted as a limiting factor of the scope of this disclosure. In addition, the terminologies provided in this disclosure such as CMF are used for illustration and thus should not be interpreted as a limiting factor of the scope.

Figure 15:
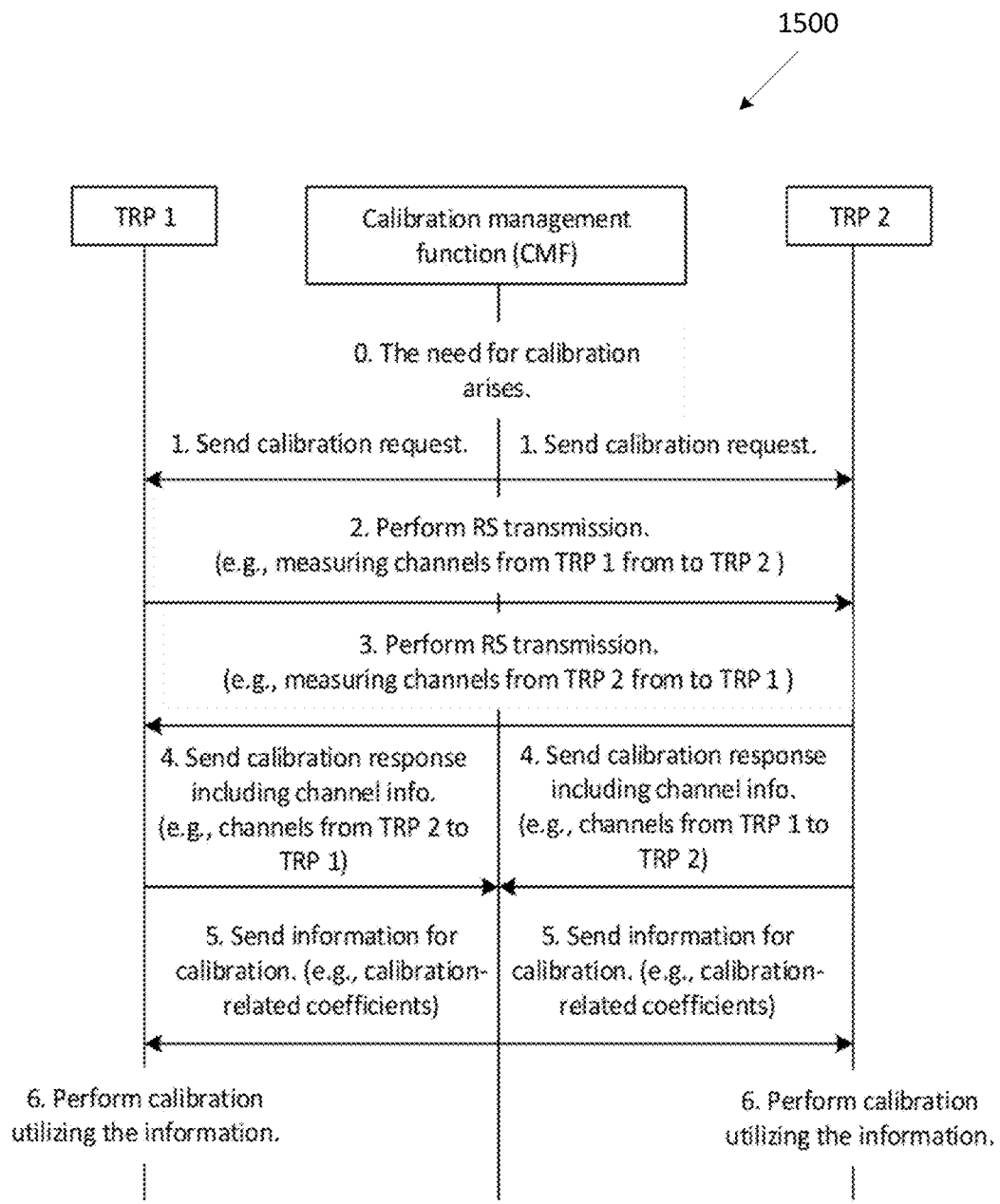
FIG. 15 illustrates a flow diagram of an example signal flow for calibration between TRPs through signaling of the CMF according to embodiments of the present disclosure

FIG. 15 illustrates a flow diagram of an example signal flow for calibration between TRPs through signaling of the CMF 1500 according to embodiments of the present disclosure. The embodiment of the signal flow for calibration between TRPs through signaling of the CMF 1500 illustrated in FIG. 15 is for illustration only. FIG. 15 does not limit the scope of this disclosure to any particular implementation of the signal flow for calibration between TRPs through signaling of the CMF 1500.

In one embodiment, the CMF sends a calibration request to the TRPs (or DUs, RUs, or other base units) which may be needed to calibrate their antenna panels, receives calibration response from the TRPs, and/or sends information for calibration to the TRPs, and/or the TRPs receive calibration request from the CMF, perform over-the-air RS transmissions/receptions, provide calibration response to the CMF, receive information for calibration from the CMF, and/or perform calibration using the information.

Although FIG. 15 illustrates the signal flow for calibration between two TRPs, this disclosure can be applicable to the cases having more than two TRPs.

In one example III.1, the calibration request can contain messages on how to perform (over-the-air) RS transmissions/receptions for TRPs whose antenna panels need to be calibrated. In one example, the messages can contain information for performing calibration via over-the-air RS transmission/reception from/to associated TRPs.

In one example III.1.1, the messages for calibration request can contain any combination of the following information elements.
1. Target TRP IDs to be calibrated with, e.g., information on the TRPs to/from which the considered TRP is to transmit/receive RS,
2. Cell ID, or any other identifier for antenna panels to be calibrated,
3. RS configurations for transmission/reception such as frequency/time resources, antenna port mappings (e.g., CSI-RS resources), and/or transmit power
4. RS transmission/reception periodicity, system frame number, slot number, and/or measurement quantities,
5. Calibration activation information
6. Information on calibration response such as subcarrier/RB/RBG/subband indices which TRPs need to report calibration-related coefficients corresponding to.

In one example III.1.2, the messages for calibration request can contain information element(s) to distinguish reference TRP(s) and non-reference TRP(s). In one example, the reference TRP(s) can be referred as the TRP being a reference for the antenna calibration among the TRPs and may not perform antenna calibration within its RF network, and the non-reference TRP(s) are referred as the TRPs whose antenna panels are to be calibrated and perform antenna calibration within the RF network of each of the TRPs.

In one example III.1.3, the messages for calibration request can contain different information elements depending on reference TRP(s) and non-reference TRP(s). In one example, beamformed RS transmission is requested for the reference TRP with indicating beamforming strategy (e.g., matched filtering (MF)) in the messages while non-beamformed RS transmission is requested for the non-reference TRP, or vice versa. For example, it is indicated by one of the messages that the reference TRP performs RS transmission with beamforming to the non-reference TRP, and the beamforming is designed based on the channel estimation for the channels from the non-reference TRP to the reference TRP.

In one example, the beamforming/precoding for a TRP is designed based on the channel estimation for the channels from other TRP(s) to the TRP, and the TRP sends RS with the beamforming/precoding. For example, the beamforming vector/matrix can be MF, (or ZF, MMSE), and this procedure can be indicated via one of the messages.

In one example III.2, TRPs perform over-the-air RS transmissions/receptions according to the calibration request (or configuration).

Since the TRPs need to perform RS transmissions/receptions on the allocated/assigned resources, the information on the allocated resources (e.g., periodicity and/or frequency/time allocation) can be useful for their associated UEs.

In one example, TRPs can inform their associated UEs of the periodicity or resource allocation information on the RS transmissions/receptions for calibration via DCI/MAC-CE/RRC signaling. In one example, the informed UEs can skip PDCCH monitoring on the allocated resources for the calibration among TRPs. In another example, the UEs can perform UL grant-free access on resources other that the allocated resources.

In one example III.3, the calibration response can contain messages on information required for computing calibration coefficients for antenna panels of TRPs, such as estimated channel state information using the over-the-air RS receptions at each of the TRPs.

For example, TRP i can send the calibration response containing estimated channel state information, from TRP j to TRP i for j≠i. In one example, there can be one or multiple TRPs transmitting RS to TRP i, and send the CSI for the channels of the multiple TRPs.

In one example III.3.1, explicit channel state information is contained in messages for the calibration response. In one example, each channel coefficient of the channels $H_{ij}$ that are estimated at TRP i through receiving the RSs transmitted from TRP j can be quantized for phase and/or amplitude and the quantized values are selected from different codebooks.

In another example III.3.2, each channel coefficient of the channels $H_{ij}$ can be quantized for phase and/or power (i.e., square of the amplitude) and the quantized values are selected from different codebooks.

In another example 111.3.3, each channel coefficient of the channels $H_{ij}$ can be quantized for real and imaginary values and the quantized values are selected from different codebooks.

In one example III.3.4, the codebook for phase values can be either 8PSK, 16PSK, 32PSK, . . . , or X-PSK codebook, where X-PSK needs $\log_2 X$ bits.

In one example III.3.5, the codebook for amplitude values can be a set of N equidistance points in [0, A] where A can be a positive value. For example, A=1, N=16 (4-bit amplitude codebook).

In one example III.3.6, the codebook for amplitude values can be a set of N non-equidistance points in [0, A] where A can be a positive value. For example, A=1, N=16 (4-bit amplitude codebook) with:

| 4-bit amplitude codebook | |
| --- | --- |
| Index | Amplitude |
| 0 | 0 |
| 1 | $\frac{1}{\sqrt{128}}$ |
| 2 | $\left(\frac{1}{8192}\right)^{1/4}$ |
| 3 | $\frac{1}{8}$ |
| 4 | $\left(\frac{1}{2048}\right)^{1/4}$ |
| 5 | $\frac{1}{2\sqrt{8}}$ |
| 6 | $\left(\frac{1}{512}\right)^{1/4}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{1/4}$ |
| 11 | $\frac{1}{2}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 |

In one example III.3.7, the codebook for power values can be a set of N equidistance points in [0, A] where A can be a positive value. For example, A=1, N=16 (4-bit amplitude codebook).

In one example III.3.8, the codebook for power values can be a set of N non-equidistance points in [0, A] where A can be a positive value. For example, A=1, N =16 (4-bit amplitude codebook), and the power value for each index could be the square of the value for each index shown in the 4-bit amplitude codebook.

In one example III.3.9, the coefficient of $H_{ij}$ can be computed for configured subcarriers/RBs/RBGs/subbands indices within the assigned resource allocation.

In one example III.3.10, the messages/information for calibration response can contain an ACK/NACK message. For example, ACK/NACK message can indicate that the considered TRP successfully decodes RSs from other TRPs or performs RS transmissions/receptions. In one example, reference TRP(s) does not have to report calibration-related coefficients but only report the ACK/NACK message.

In one example III.4, information/messages for calibration can contain calibration coefficients for TRPs to perform antenna calibration within their own RF networks. The information/messages can be different depending on reference TRP(s) and non-reference TRP(s).

In one example III.4.1, information can contain calibration coefficients for pairs of TX and RX antennas and the coefficients can be quantized for phase and/or amplitude. The quantized values for phase and amplitude are selected from codebooks.

In one example III.4.2, information can contain calibration coefficients for pairs of TX and RX antennas and the coefficients can be quantized for phase and/or power (the square of amplitude). The quantized values for phase and power are selected from codebooks.

In one example III.4.3, information can contain calibration coefficients for pairs of TX and RX antennas and the coefficients can be quantized for real and/or imaginary values. The quantized values for real and imaginary are selected from codebooks.

In one example III.4.4, the codebook for phase values can be either 8PSK, 16PSK, 32PSK, . . . , or X-PSK codebook, where X-PSK needs log2 X bits.

In one example III.4.5, the codebook for amplitude values can be a set of N equidistance points in [0, A] where A can be a positive value. For example, A=1, N=16 (4-bit amplitude codebook).

In one example III.4.6, the codebook for amplitude values can be a set of N non-equidistance points in [0, A] where A can be a positive value. For example, A=1, N=16 (4-bit amplitude codebook) with the table shown in example 1.3.6.

In one example III.4.7, the codebook for power values can be a set of N equidistance points in [0, A] where A can be a positive value. For example, A=1, N=16 (4-bit amplitude codebook).

In one example III.4.8, the codebook for power values can be a set of N non-equidistance points in [0, A] where A can be a positive value. For example, A=1, N=16 (4-bit amplitude codebook), and the power value for each index could be the square of the value for each index shown in the 4-bit amplitude codebook.

In one embodiment IV, calibration reference signals (calib-RS) are designed for the purpose of calibration among antenna panels of TRPs.

In one example IV.1, calib-RS is designed based on synchronized signals/PBCH blocks. As an example, since TRPs send calib-RS to other TRPs, the transmitted calib-RS can cover the coverage between the TRPs during the calib-RS transmissions, where their associated UEs are located. For example, calib-RS has additional message block to contain an indication of calib-RS scrambled with an ID, e.g., target TRP ID, in addition to the messages of SSB. This ensures that calib-RSs can be decoded as SSB for UEs and can be decoded as calib-RSs for target TRPs. Thus calib-RSs can be used for SSB as well as for calibration In one example IV.2, calib-RS is designed based on CSI-RS or SRS. For example, scrambling IDs for calib-RS can be newly defined with a different number of total scrambling IDs. The pseudo-random sequence generator can be initialized with different function from CSI-RS or SRS. For example, there is additional offset value in the generate function.

In one example IV.3, calib-RS is designed based on other RS forms, e.g., PTRS, DMRS, positioning RS, RIM-RS. The pseudo-random sequence generator can be initialized with different function from PTRS, DMRS, positioning RS, and/or RIM-RS. For example, there is additional offset value in the generate function.

In one embodiment V, a UE is configured to detect 'calibration necessity' and/or report status on the calibration. It can be periodically, periodically, or semi-persistently configured by NW.

In one example, NW configures MDL RSs (or DL RS resource sets) (e.g., CSI-RS, SSB, DMRS) for UE to measure the signal qualities for the channels from TRPs in NW, and/or to measure the signal qualities for the composite channels of some TRPs in NW, and/or to compare the measured signal qualities using certain criteria to detect 'calibration necessity' for the NW, and/or to report status on the calibration necessity. In one example, the signal qualities can be measured in RSRP/RSRQ/SINR/BER/BLER.

In one example, each of the configured RS/RS resource set for calibration necessity detection can be associated with one or multiple TRPs. In one example, each of M−1 RS/RS resource sets is associated with individual TRP, and 1 RS/RS resource set is associated with all of the TRPs that are associated with the M−1 RS/RS resource sets.

Figure 16:
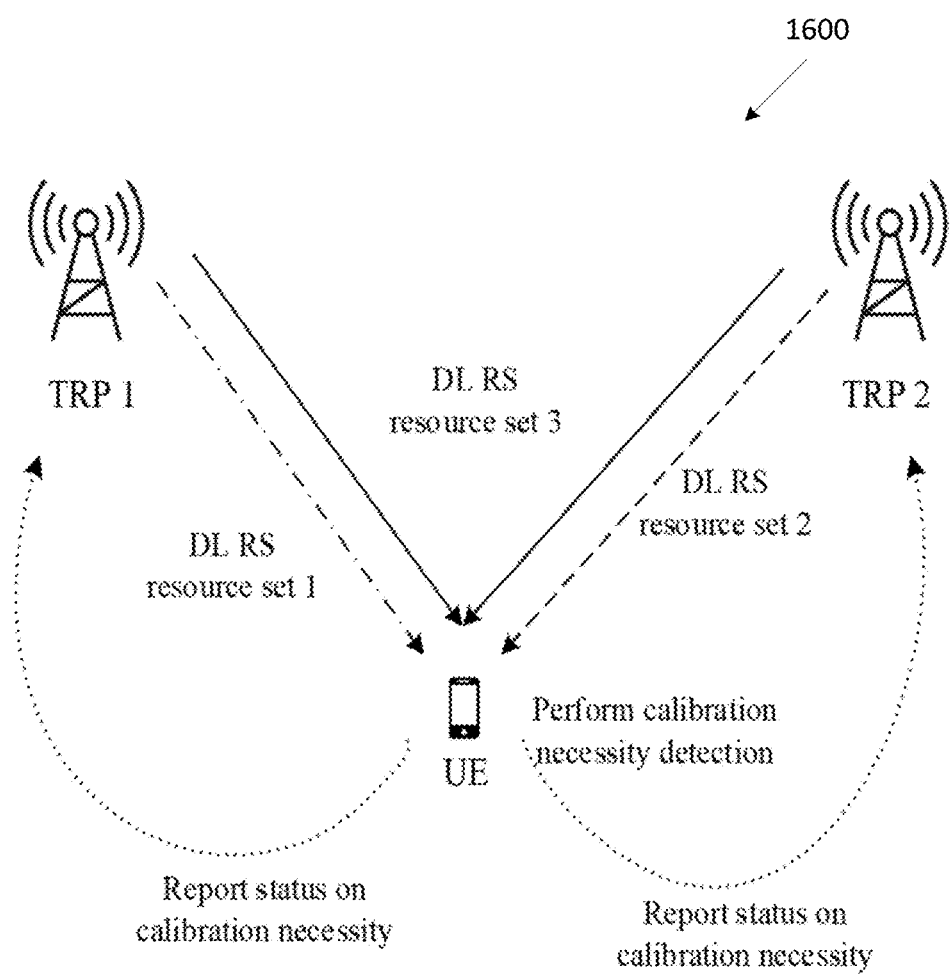
FIG. 16 illustrates an example of calibration necessity detection and reporting 1600 according to embodiments of the present disclosure

FIG. 16 illustrates an example of calibration necessity detection and reporting 1600 according to embodiments of the present disclosure. The embodiment of the calibration necessity detection and reporting 1600 illustrated in FIG. 16 is for illustration only. FIG. 16 does not limit the scope of this disclosure to any particular implementation of the calibration necessity detection and reporting 1600.

In one example, M=3. In one example, the UE is configured to measure three RS resource sets, and the NW transmits RSs associated with resource set 1 from TRP 1, transmits RSs associated resource set 2 from TRP 2, and transmits RSs associated with resource set 3 from TRPs 1 and 2 via composite RS transmissions (i.e., TRPs 1 and 2 jointly transmit RSs associated with resource set 3 so that UE can measure the signal quality of the composite channels of TRP 1 and TRP 2), as shown in FIG. 16.

In one example, the UE can compare the signal quality of the composite RS transmissions from TRPs 1 and 2 with the sum of the signal qualities of the separate RS transmissions from TRP 1 and TRP 2, and determine the calibration necessity at the NW, as shown in FIG. 16.

In one example, criteria for triggering/detecting calibration necessity to the NW can be based on RSRP/RSRQ/SINR comparisons.

In one example, if $\Delta_{RSRP}=RSRP_1+RSRP_2-RSRP_{3(composite)} \geq TH_1$, the UE informs NW of calibration necessity. The threshold $TH_1$ can be configured by NW or fixed.

In one example, if $\Delta_{RSRQ}=RSRQ_1+RSRQ_2-RSRQ_{3(composite)} \geq TH_3$, the UE informs NW of calibration necessity. The threshold $TH_2$ can be configured by NW or fixed.

In one example, if $\Delta_{SINR}=SINR_1+SINR_2-SINR_{3(composite)} \geq TH_3$, the UE informs NW of calibration necessity. The threshold $TH_3$ can be configured by NW or fixed.

In another example, M>3 cases can be extended similar to the above examples.

In one example, the UE reports status of the calibration necessity.

In one example, the UE can report the status explicitly using 1-bit indicator, e.g., ACK/NACK or '0' indicates no calibration needed whereas '1' indicate calibration needed.

In one example, the UE can report the quantized value for $\Delta_x$, where X∈{RSRP, RSRQ, SINR} if calibration necessity is detected. The quantized value can be selected from codebook whose elements are equidistance/non-equidistance points in $[TH_i,A]$ dB, where $A \geq TH_i$ and i∈{1,2,3}. In one example, A is configured by NW or fixed. If calibration necessity is not detected, in one example, the UE can ignore to report, which implicitly there is no need for calibration. In another example, the UE reports ACK message for explicitly informing calibration unnecessity.

In one example, the NW can perform calibration mechanisms among TRPs via the calibration mechanism between TRPs described above, once the calibration necessity is reported from UE.

Any of the above variation embodiments can be utilized independently or in combination with at least one other variation embodiment.

Figure 17:
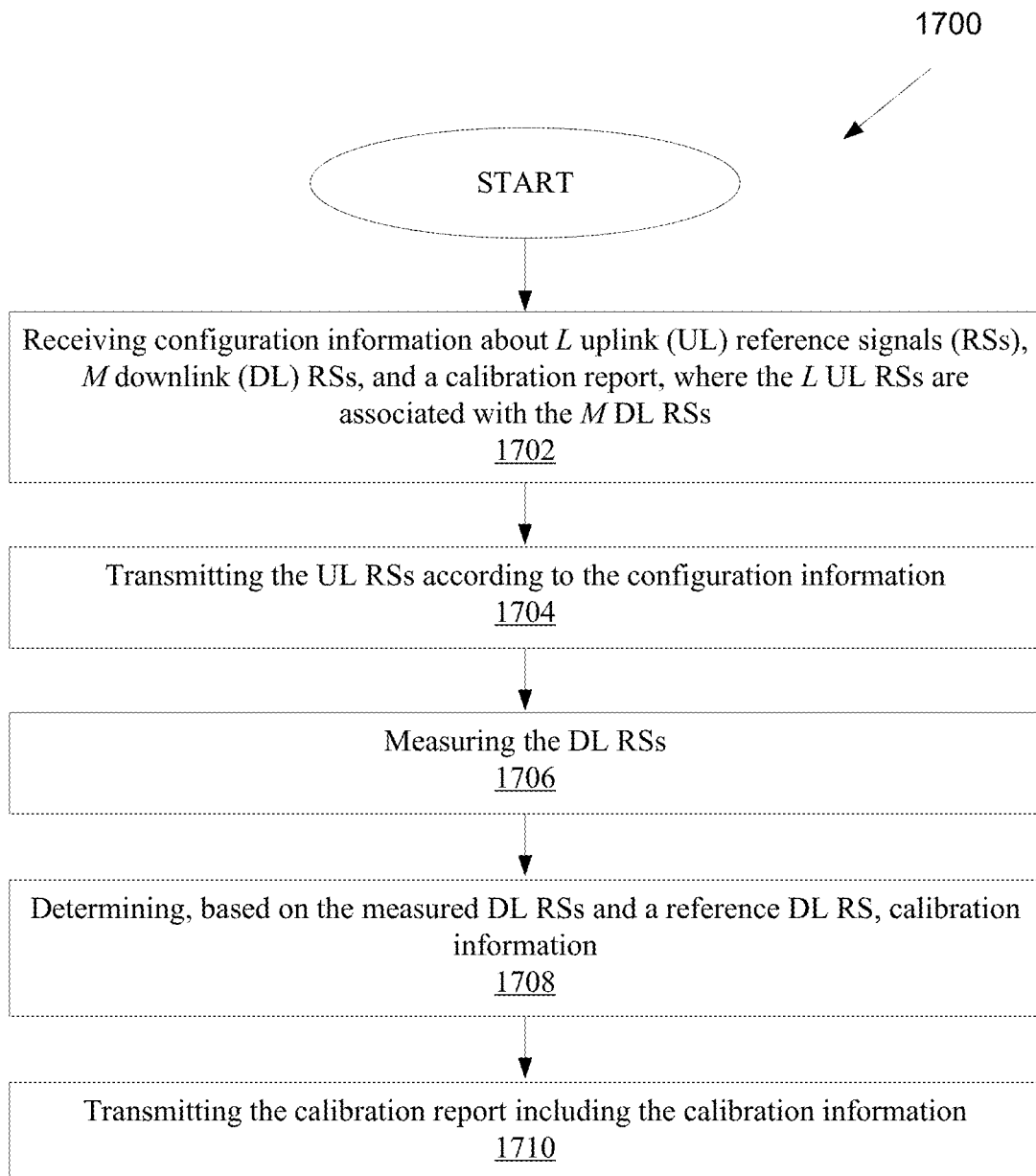
FIG. 17 illustrates a flow chart of a method for operating a UE according to embodiments of the present disclosure.

FIG. 17 illustrates a flow chart of a method 1700 for operating a user equipment (UE), as may be performed by a UE such as UE 116, according to embodiments of the present disclosure. The embodiment of the method 1700 illustrated in FIG. 17 is for illustration only. FIG. 17 does not limit the scope of this disclosure to any particular implementation.

As illustrated in FIG. 17, the method 1700 begins at step 1702. In step 1702, the UE (e.g., 111-116 as illustrated in FIG. 1) receives configuration information about L uplink (UL) reference signals (RSs), M downlink (DL) RSs, and a calibration report, where the L UL RSs are associated with the MDL RSs.

In step 1704, the UE transmits the UL RSs according to the configuration information.

In step 1706, the UE measures the DL RSs.

In step 1708, the UE determines, based on the measured DL RSs and a reference DL RS, calibration information.

In step 1710, the UE transmits the calibration report including the calibration information.

In one embodiment, when L=1, M=$N_{RRH}$, and the UL RS is associated with the M DL RSs, or when L=M=$N_{RRH}$, each UL RS is associated with a corresponding DL RS, where $N_{RRH}$ is a number of remote radio heads (RRHs) or transmission and reception points (TRPs).

In one embodiment, the calibration information includes calibration phase or calibration amplitude coefficients selected from respective codebooks.

In one embodiment, an $n_p$-bit phase shift keying (PSK) codebook is used for calibration phases, or an $n_a$-bit codebook comprising equidistance points in [0,1] in dB-scale or linear-scale is used for calibration amplitudes, wherein the configuration information further includes $n_p$ or $n_a$.

In one embodiment, the UE determines the reference DL RS based on the measured DL RSs, and the calibration information includes the reference DL RS.

In one embodiment, the configuration information includes the reference DL RS.

In one embodiment, the processor is further configured to dynamically or semi-persistently trigger UL RS transmission, DL RS reception, or calibration reporting based on downlink control information (DCI) or a medium access control-control element (MAC-CE).

FIG. 18 illustrates a flow chart of another method 1800, as may be performed by a base station (BS) such as BS 102, according to embodiments of the present disclosure. The embodiment of the method 1800 illustrated in FIG. 18 is for illustration only. FIG. 18 does not limit the scope of this disclosure to any particular implementation.

As illustrated in FIG. 18, the method 1800 begins at step 1802. In step 1802, the BS (e.g., 101-103 as illustrated in FIG. 1), generates configuration information about L uplink (UL) reference signals (RSs), M downlink (DL) RSs, and a calibration report, where the L UL RSs are associated with the M DL RSs.

In step 1804, the BS transmits the configuration information.

In step 1806, the BS receives the UL RSs.

In step 1808, the BS receives the calibration report including calibration information, wherein the calibration information is based on measured DL RSs and a reference DL RS.

In one embodiment, when L=1, M=$N_{RRH}$, and the UL RS is associated with the M DL RSs, or when L=M=$N_{RRH}$, each UL RS is associated with a corresponding DL RS, where $N_{RRH}$ is a number of remote radio heads (RRHs) or transmission and reception points (TRPs).

In one embodiment, the calibration information includes calibration phase or calibration amplitude coefficients selected from respective codebooks.

In one embodiment, an $n_p$-bit phase shift keying (PSK) codebook is used for calibration phases, or an $n_a$-bit codebook comprising equidistance points in [0,1] in dB-scale or linear-scale is used for calibration amplitudes, wherein the configuration information further includes $n_p$ or $n_a$.

In one embodiment, the calibration information includes the reference DL RS, wherein the reference DL RS is based on the measured DL RSs.

In one embodiment, the configuration information includes the reference DL RS.

In one embodiment, UL RS reception, DL RS transmission, or calibration reporting is dynamically or semi-persistently triggered via downlink control information (DCI) or a medium access control-control element (MAC-CE).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver configured to:
      receive configuration information about L uplink (UL) reference signals (RSs), M downlink (DL) RSs, and a calibration report, wherein the L UL RSs are associated with the M DL RSs, where L≥1 and M≥1; and
      transmit the L UL RSs according to the configuration information; and
   a processor operably coupled to the transceiver, the processor configured to:
      measure the M DL RSs; and
      determine, based on the measured M DL RSs and a reference DL RS, calibration information,
   wherein the transceiver is further configured to transmit the calibration report including the calibration information.

2. The UE of claim 1, wherein:
   when L=1, M=$N_{RRH}$, and a UL RS is associated with the M DL RSs, or
   when L=M=$N_{RRH}$, each UL RS is associated with a corresponding DL RS,
   where $N_{RRH}$ is a number of remote radio heads (RRHs) or transmission and reception points (TRPs).

3. The UE of claim 1, wherein the calibration information includes calibration phase or calibration amplitude coefficients selected from respective codebooks.

4. The UE of claim 3, wherein:
   an $n_p$-bit phase shift keying (PSK) codebook is used for calibration phases, or
   an $n_a$-bit codebook comprising equidistance points in [0,1] in dB-scale or linear-scale is used for calibration amplitudes,
   wherein the configuration information further includes $n_p$ or $n_a$, where $n_p$≥1 and $n_a$≥1.

5. The UE of claim 1, wherein:
   the processor is further configured to determine the reference DL RS based on the measured M DL RSs, and
   the calibration information includes the reference DL RS.

6. The UE of claim 1, wherein the configuration information includes the reference DL RS.

7. The UE of claim 1, wherein the processor is further configured to dynamically or semi-persistently trigger transmission of L UL RS, reception of M DL RS, or calibration reporting based on downlink control information (DCI) or a medium access control-control element (MAC-CE).

8. A base station (BS) comprising:
   a processor configured to generate configuration information about L uplink (UL) reference signals (RSs), M downlink (DL) RSs, and a calibration report, wherein the L UL RSs are associated with the M DL RSs, where L≥1 and M≥1; and
   a transceiver operably coupled to the processor, the transceiver configured to:
      transmit the configuration information;
      receive the L UL RSs; and
      receive the calibration report including calibration information,
   wherein the calibration information is based on measured M DL RSs and a reference DL RS.

9. The BS of claim 8, wherein:
   when L=1, M=$N_{RRH}$, and a UL RS is associated with the M DL RSs, or
   when L=M=$N_{RRH}$, each UL RS is associated with a corresponding DL RS,
   where $N_{RRH}$ is a number of remote radio heads (RRHs) or transmission and reception points (TRPs).

10. The BS of claim 8, wherein the calibration information includes calibration phase or calibration amplitude coefficients selected from respective codebooks.

11. The BS of claim 10, wherein:
    an $n_p$-bit phase shift keying (PSK) codebook is used for calibration phases, or
    an $n_a$-bit codebook comprising equidistance points in [0,1] in dB-scale or linear-scale is used for calibration amplitudes,
    wherein the configuration information further includes $n_p$ or $n_a$, where $n_p$≥1 and $n_a$≥1.

12. The BS of claim 8, wherein the calibration information includes the reference DL RS, wherein the reference DL RS is based on the measured M DL RSs.

13. The BS of claim 8, wherein the configuration information includes the reference DL RS.

14. The BS of claim 8, wherein L UL RS reception, M DL RS transmission, or calibration reporting is dynamically or semi-persistently triggered via downlink control information (DCI) or a medium access control-control element (MAC-CE).

15. A method for operating a user equipment (UE), the method comprising:
  receiving configuration information about L uplink (UL) reference signals (RSs), M downlink (DL) RSs, and a calibration report, wherein the L UL RSs are associated with the M DL RSs, where L≥1 and M≥1;
  transmitting the L UL RSs according to the configuration information;
  measuring the M DL RSs; and
  determining, based on the measured M DL RSs and a reference DL RS, calibration information, and
  transmitting the calibration report including the calibration information.

16. The method of claim 15, wherein:
  when L=1, M=$N_{RRH}$, and a UL RS is associated with the M DL RSs, or
  when L=M=$N_{RRH}$, each UL RS is associated with a corresponding DL RS,
  where $N_{RRH}$ is a number of remote radio heads (RRHs) or transmission and reception points (TRPs).

17. The method of claim 15, wherein the calibration information includes calibration phase or calibration amplitude coefficients selected from respective codebooks.

18. The method of claim 17, wherein:
  an $n_p$-bit phase shift keying (PSK) codebook is used for calibration phases, or
  an $n_a$-bit codebook comprising equidistance points in [0,1] in dB-scale or linear-scale is used for calibration amplitudes,
  wherein the configuration information further includes $n_p$ or $n_a$, where $n_p$≥1 and $n_a$≥1.

19. The method of claim 15, wherein:
  the reference DL RS is determined based on the measured M DL RSs, or
  the reference DL RS is included in the configuration information, and
  the calibration information includes the reference DL RS.

20. The method of claim 15, further comprising dynamically triggering reception of L UL RS, transmission of M DL RS, or calibration reporting based on downlink control information (DCI) or a medium access control-control element (MAC-CE).

* * * * *